US011863815B2

(12) United States Patent
Sai et al.

(10) Patent No.: US 11,863,815 B2
(45) Date of Patent: Jan. 2, 2024

(54) METHODS AND SYSTEMS FOR MANAGING STORAGE OF VIDEOS IN A STORAGE DEVICE

(71) Applicant: LightMetrics Technologies Pvt. Ltd., Bangalore (IN)

(72) Inventors: Krishna Sai, Bangalore (IN); Krishna A G, Bangalore (IN); Gururaj Putraya, Bangalore (IN); Ravi Shenoy, Bangalore (IN); Raghu Kalluri, Boduppul (IN); Pushkar Patwardhan, Bangalore (IN)

(73) Assignee: LIGHTMETRICS TECHNOLOGIES PVT. LTD., Bangalore (IN)

( * ) Notice: Subject to any disclaimer, the term of this patent is extended or adjusted under 35 U.S.C. 154(b) by 166 days.

(21) Appl. No.: 17/761,178

(22) PCT Filed: Sep. 10, 2020

(86) PCT No.: PCT/IN2020/050787
§ 371 (c)(1),
(2) Date: Mar. 16, 2022

(87) PCT Pub. No.: WO2021/053689
PCT Pub. Date: Mar. 25, 2021

(65) Prior Publication Data
US 2022/0394330 A1 Dec. 8, 2022

(30) Foreign Application Priority Data
Sep. 17, 2019 (IN) .............................. 201941037447

(51) Int. Cl.
H04N 21/44 (2011.01)
H04N 21/4147 (2011.01)
(Continued)

(52) U.S. Cl.
CPC ..... *H04N 21/44008* (2013.01); *H04N 19/156* (2014.11); *H04N 21/4147* (2013.01);
(Continued)

(58) Field of Classification Search
CPC ........... H04N 21/44008; H04N 19/156; H04N 21/4147; H04N 21/4223; H04N 21/4335;
(Continued)

(56) References Cited

U.S. PATENT DOCUMENTS 7,643,722 B2    1/2010  Nomura
8,350,907 B1 *  1/2013  Blanco ............... H04N 21/4335
                                                           348/143

(Continued)

OTHER PUBLICATIONS

J. S. Church, D. G. Martz, N. J. Cook, The use of digital video recorders (DVRs) for capturing digital video files for use in both The Observer and Ethovision, Behaviour Research Methods, 38(3):434-8, Aug. 2006, Canada.

*Primary Examiner* — Kunal Langhnoja
(74) *Attorney, Agent, or Firm* — Kanika Radhakrishnan; Evergreen Valley Law Group

(57) ABSTRACT

Systems and methods for storing videos in a storage device, more specifically in a digital video recorder (DVR). The method includes determining, for each video, a condition indicating a need to reduce the size of a respective video is determined. The condition being at least a storage period of the respective video being greater than a threshold time period. Upon determination reducing the video size either by reducing at least one quality parameter of the respective video or by eliminating at least one video segment of the video corresponding to an uneventful region. Further after the size reduction, storing the respective video as a modified version of the respective video in the storage device. Further, the video or a portion of video comprising important events can be shared with a remote device.

31 Claims, 8 Drawing Sheets

(51) Int. Cl.
*H04N 21/4223* (2011.01)
*H04N 21/4335* (2011.01)
*H04N 21/4402* (2011.01)
*H04N 21/454* (2011.01)
*H04N 19/156* (2014.01)

(52) U.S. Cl.
CPC ..... *H04N 21/4223* (2013.01); *H04N 21/4335* (2013.01); *H04N 21/4402* (2013.01); *H04N 21/4542* (2013.01)

(58) Field of Classification Search
CPC .. H04N 21/4402; H04N 21/4542; H04N 5/77; H04N 9/8205; H04N 19/132; H04N 19/184; H04N 19/40; H04N 19/587; H04N 19/59; H04N 21/440254; H04N 7/18; H04N 21/8456
See application file for complete search history.

(56) References Cited

U.S. PATENT DOCUMENTS

| | | | |
|---|---|---|---|
| 8,422,733 B2* | 4/2013 | Reisman | H04N 21/234327 369/13.38 |
| 8,577,205 B2 | 11/2013 | Barton et al. | |
| 10,687,115 B2* | 6/2020 | Muvavarirwa | H04N 21/64322 |
| 2015/0003814 A1* | 1/2015 | Miller | H04N 21/4334 386/297 |
| 2017/0208349 A1* | 7/2017 | Saptharishi | H04N 21/64738 |

* cited by examiner

[Fig. 1]
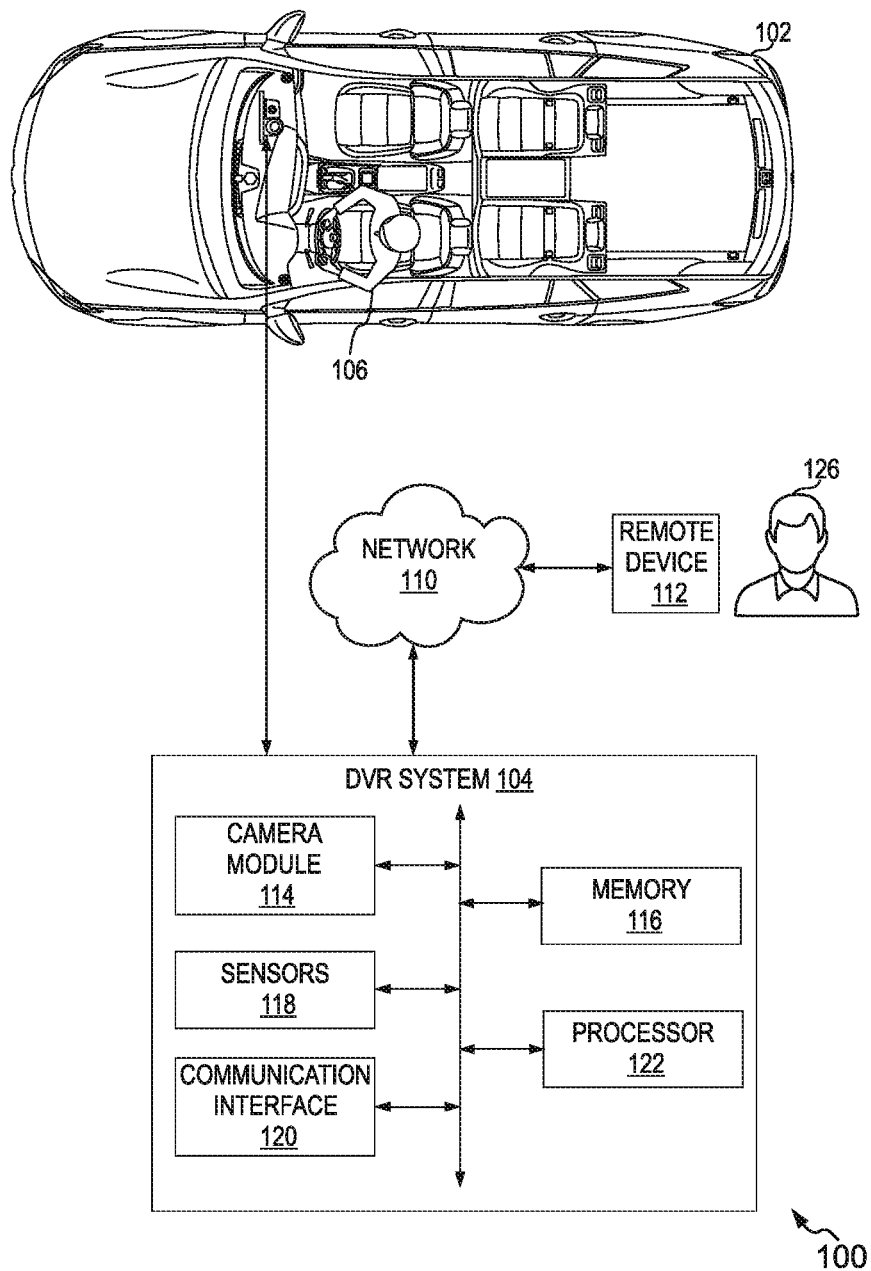

[Fig. 2]
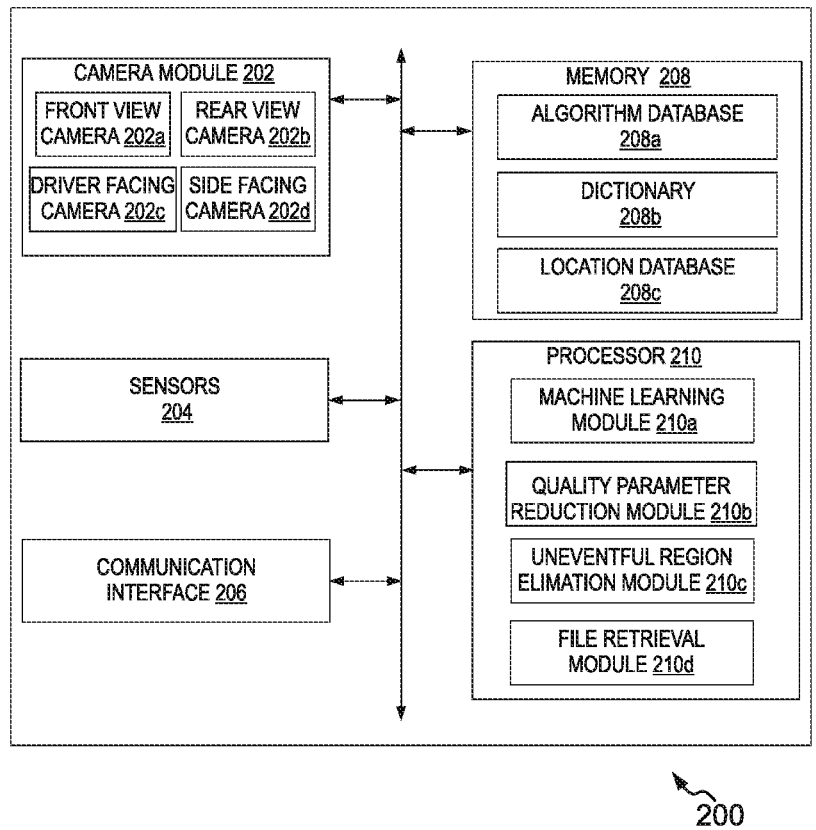
[Fig. 3]
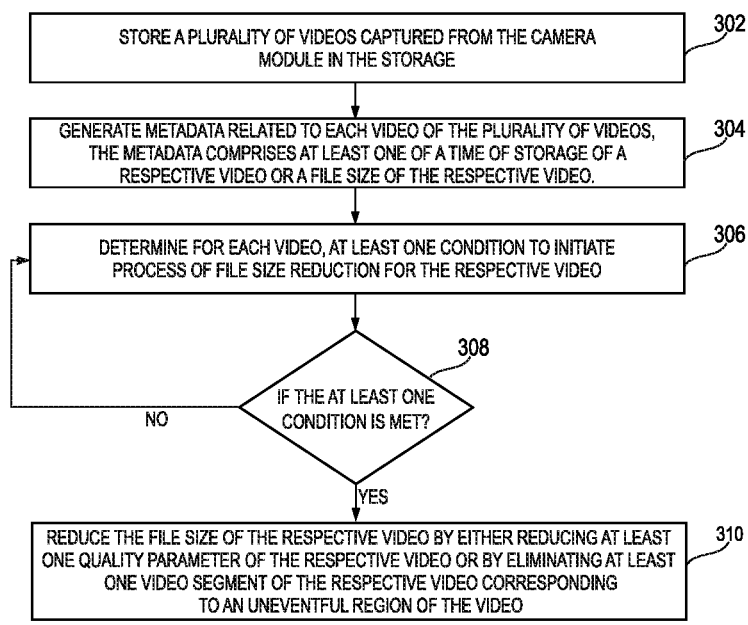

[Fig. 4]
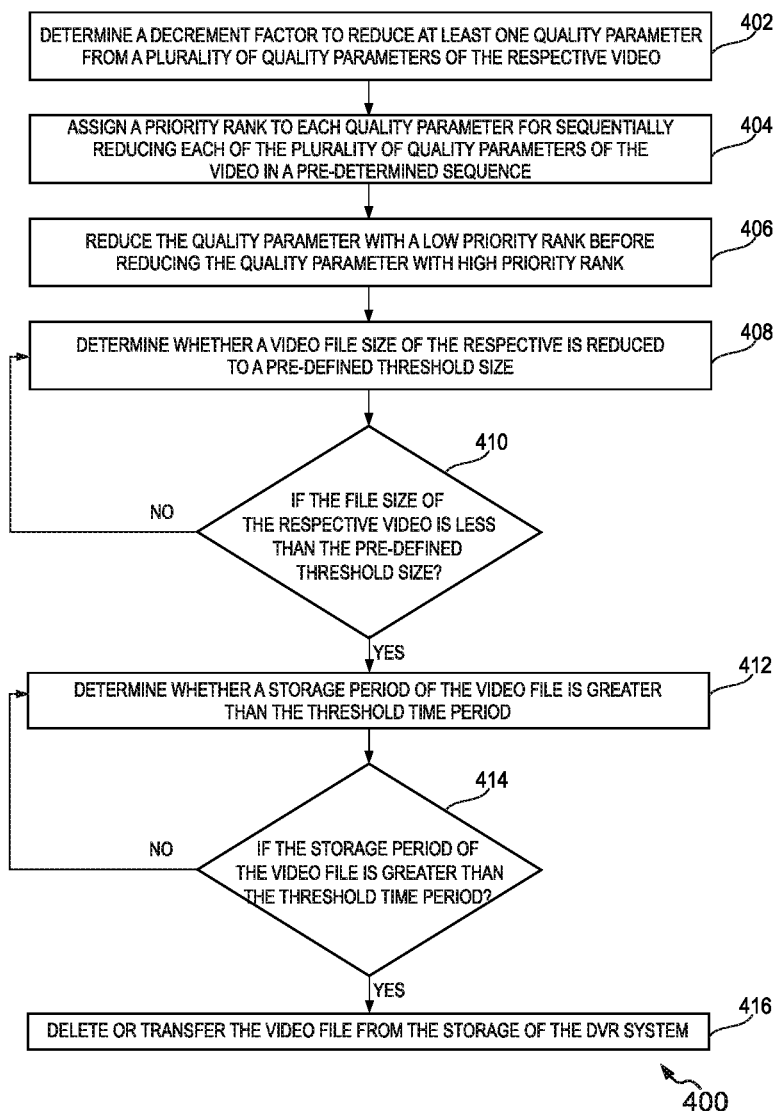
[Fig. 5]
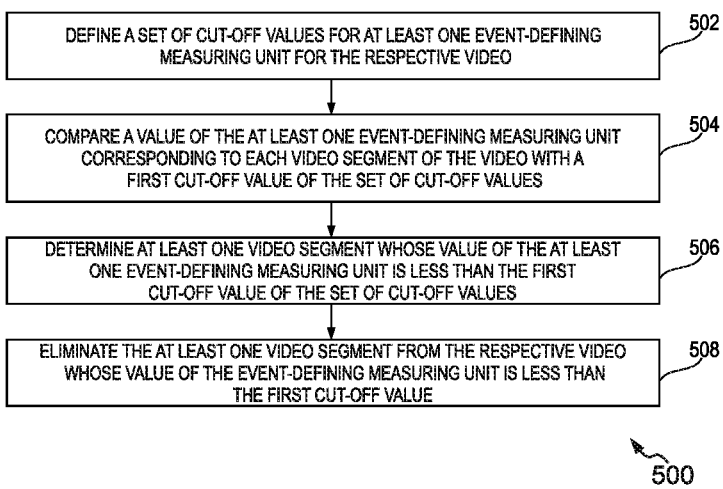

[Fig. 6]
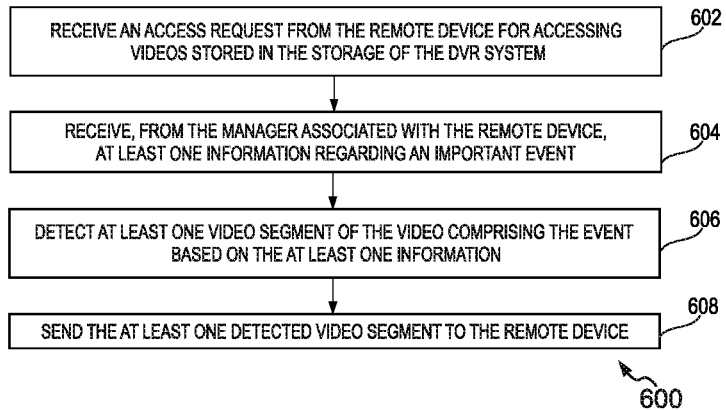
[Fig. 7]
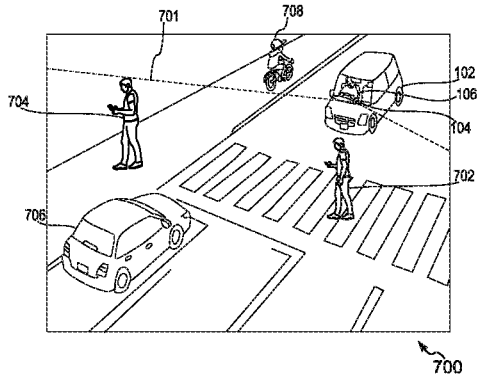
[Fig. 8]
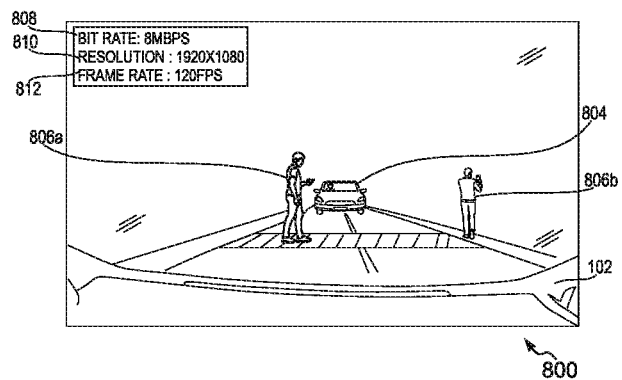
[Fig. 9A]
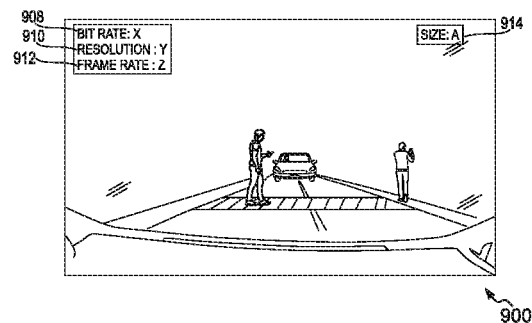

[Fig. 9B]
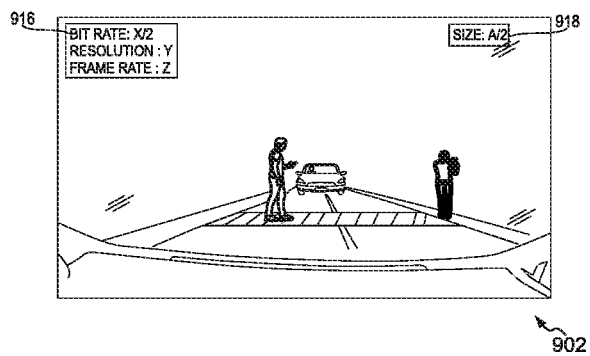
[Fig. 9C]
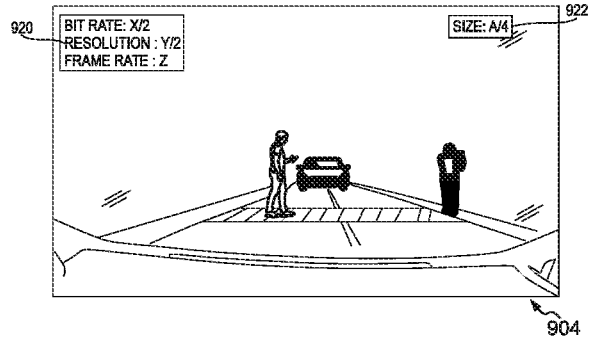
[Fig. 9D]
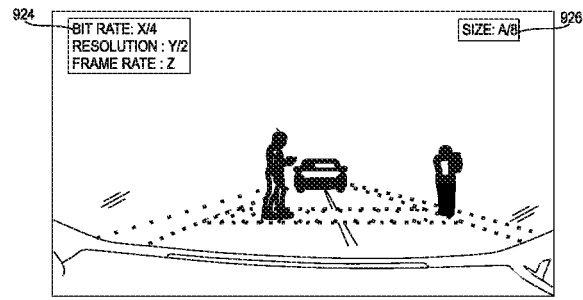
[Fig. 10A]
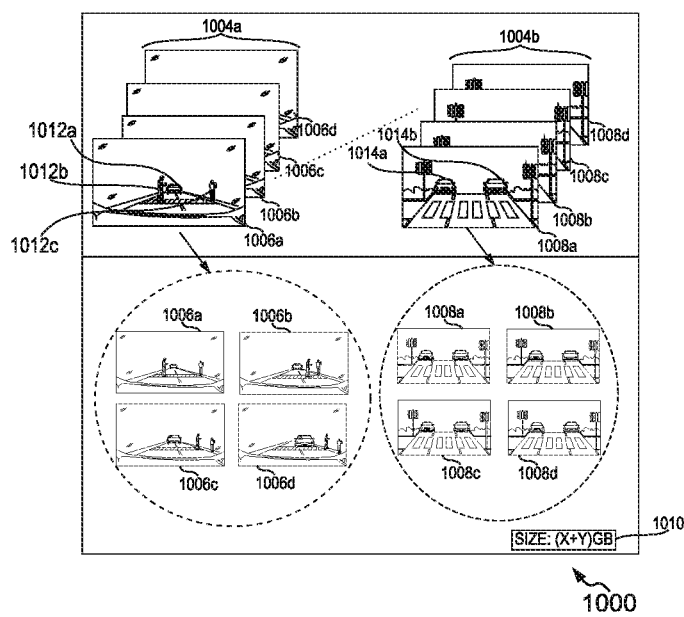

[Fig. 10B]
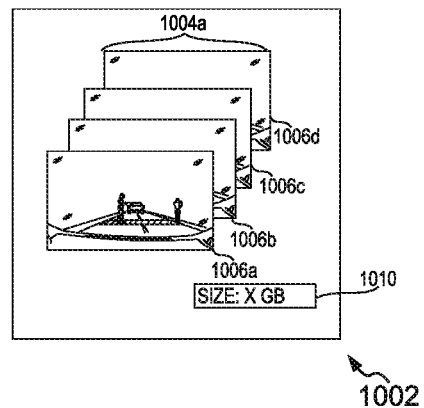
[Fig. 11]
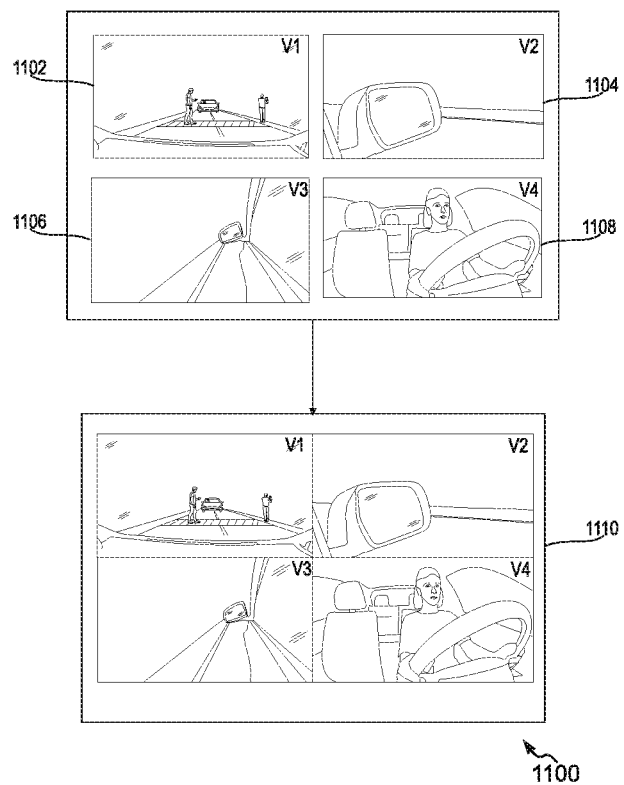
[Fig. 12]
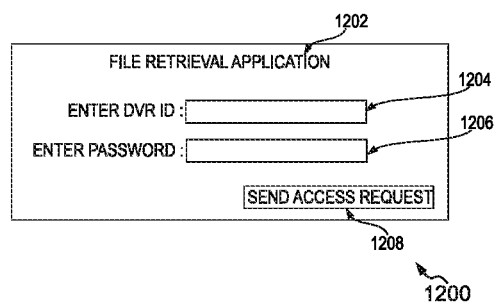

[Fig. 13A]
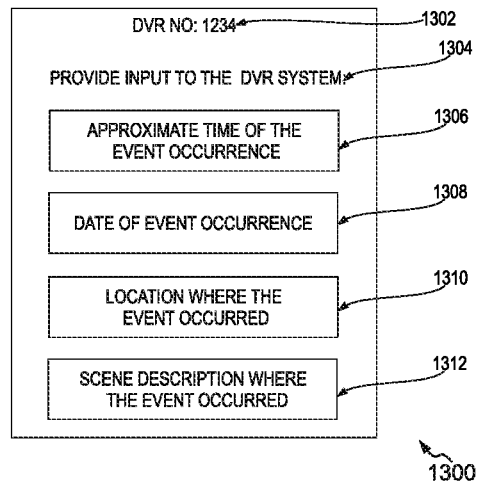
[Fig. 13B]
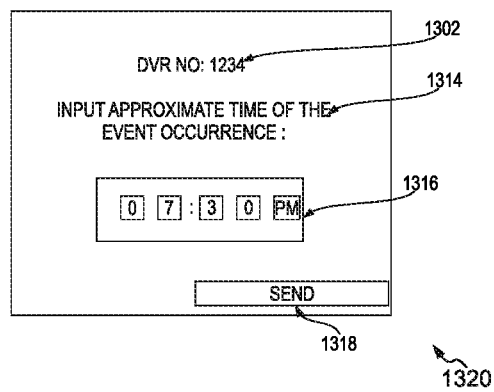
[Fig. 14A]
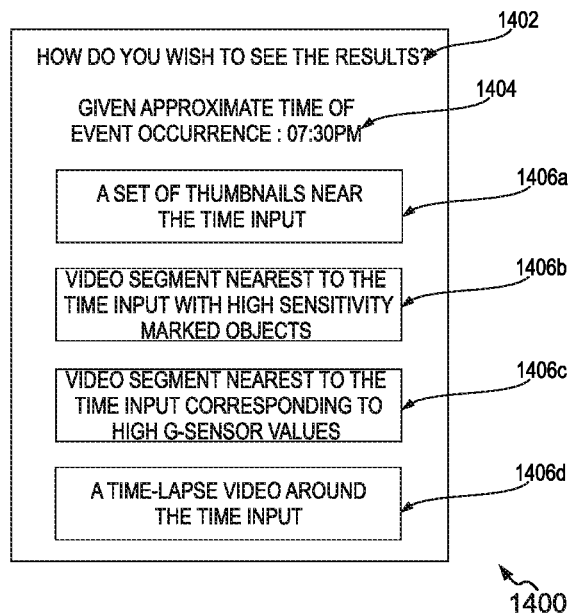

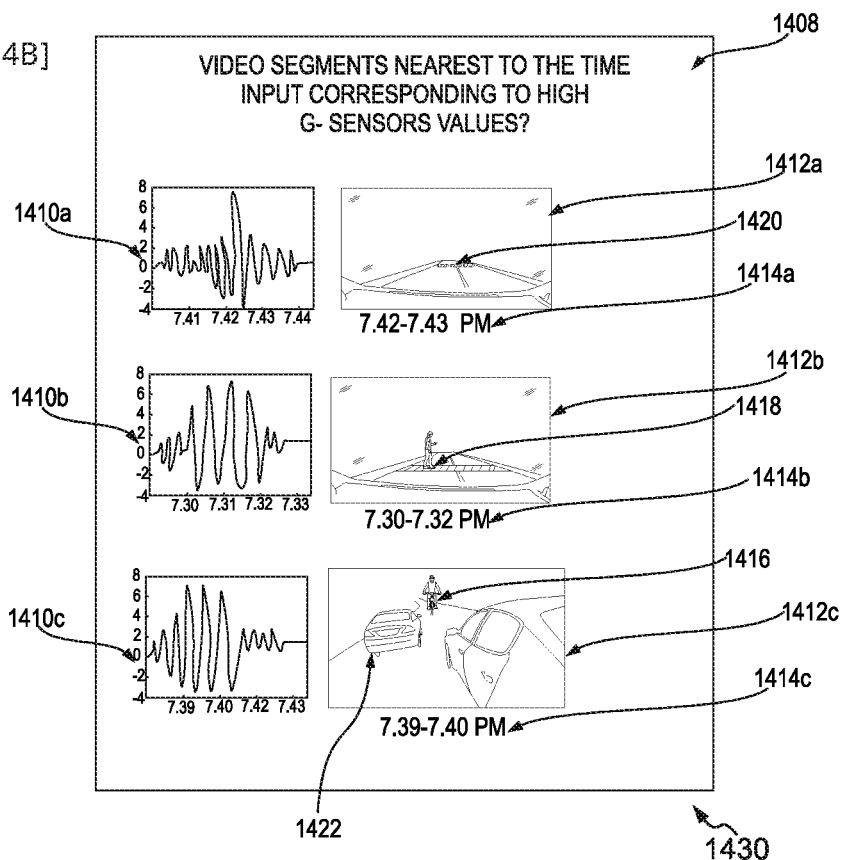
[Fig. 14B]
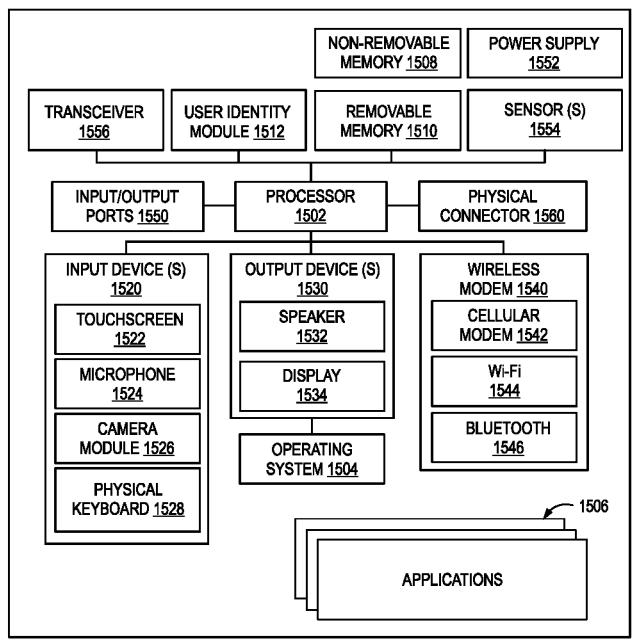
[Fig. 15]

METHODS AND SYSTEMS FOR MANAGING STORAGE OF VIDEOS IN A STORAGE DEVICE

TECHNICAL FIELD

The present disclosure relates to managing storage of videos in a storage device with limited storage capability without loss of important video, and more particularly to, methods and systems for storing the videos for a longer duration in the storage device of a Digital Video Recorded (DVR) system and providing video on demand to a remote device from the DVR system.

BACKGROUND ART

A digital video recorder (DVR) is an electronic device used to record videos and store it in a local storage device, such as an in-built memory, a disk drive, USB drive, SD memory card, and the like. The storage capability of the local storage device is generally limited and therefore a limited amount of video data can be retained. The DVR may correspond to a dashboard camera (dashcam), a security camera system, a surveillance camera system, a drone camera and the like that records the scene through different angles and stores it in the local storage device. In some applications, the DVR systems are employed to record everyday occurring events for purpose of monitoring situations such as monitoring everyday driving behavior of a driver of a vehicle, everyday monitoring of people entering in a facility, monitoring of traffic in a particular area, monitoring operations in a particular area, monitoring operations of a particular machinery and the like. As the data is captured 24*7 everyday, previous data needs to be deleted or moved to different storage devices for creating storage space for recording new video data. These DVRs can be of a great use as evidence in an event of an accident, a collision or any other incident that could be of interest. Understanding the incident scene, for example knowing how the vehicle was driven by a human behind the wheels is of utmost priority considering that most of the accidents are caused by human errors All the drivers involved in the collision are under suspicion and this causes a lot of ambiguity, loss of money, loss of reputation, loss of time, etc., and many times it might not serve justice to the drivers. In this light, the video from these DVRs can provide a means for the drivers and the concerned people to find out who was at fault during the collision.

Nowadays, with the increasing population comes an increase in mis-happenings on road. Hence, everybody wants to record as much data as possible at a higher quality. The existing systems cannot afford huge amount of data to be stored in the local storage devices. The capacity of a memory card (SD card or flash memory) is confined and hence it leads to a trade-off to be made on how long the data is to be kept and at what quality. A user would ideally need a higher quality video stored for a longer time to be able to access the video when needed for investigation purposes and check what happened clearly during the miss-happening. Further, multi-camera systems such as 360 degrees vision are common to provide protection all around the point of interest, and the amount of storage with such cameras is even more.

In the existing system, DVRs have a local storage (e.g., an SD card, or a flash memory) in the system on which a plurality of videos from the camera/cameras are stored. Users have limited space to store the recorded videos. Hence, they have the option of either maximizing the duration for the video to be stored which in-turn affects the quality of the video and vice-versa. Further, another option for the users is to upload the recorded video to a cloud storage but the cost incurred will be exceptionally high and not affordable. One can also upload the videos over Wi-Fi when the vehicle is at a home base, but it is not always the case since long distance travelling involves vehicles staying away from the home base for many days or weeks at a stretch.

In the light of the above discussion, there exists a need for providing a real-time method and system that can increase a storage duration of the recorded videos in the storage device, also at a considerably better quality.

SUMMARY OF INVENTION

Various embodiments of the present disclosure provide methods and system for facilitating longer storage of videos in a storage device.

In an embodiment, a video storage method is disclosed. The method includes storing a plurality of videos in a storage device of a system. The method includes generating metadata corresponding to each video of the plurality of videos. The metadata includes at least one of a time of the storage of a respective video, or a size of the respective video in the storage device and the data from plurality of sensors positioned in the system. The method includes determining, for each video, a condition indicating a need for reducing size of a respective video, wherein the condition includes a storage period of the respective video exceeding a threshold time period, wherein the storage period corresponds to a lapsed time period from at least one of the time of storage of the respective video in the system, or a time of storage of a modified version of the respective video in the system. Upon determination, the method further includes reducing the size of the respective video present in the storage device based, at least in part, on at least one of: reducing at least one quality parameter from a plurality of quality parameters of the respective video by a pre-determined decrement factor or eliminating at least one video segment of the respective video corresponding to an uneventful region of the video. The respective video with reduced size is stored as the modified version of the respective video in the storage device. In some embodiments, the machine learning module present in the processor is configured to update decrement factor based on various learning algorithms. In some embodiments, the decrement factor may correspond to the probability, likelihood and/or confidence of the decisions output by the machine learning module.

In another embodiment, a system is disclosed. The system includes a memory storing executable instructions and a processor in operative communication with the memory. The processor is configured to execute the instructions to cause the system to perform a method. The method includes storing a plurality of videos in a storage device. The method includes generating metadata corresponding to each video of the plurality of videos. The metadata includes at least one of a time of the storage of a respective video, or a size of the respective video in the storage device and a plurality of sensors positioned in the system. The method includes determining, for each video, a condition indicating a need for reducing size of the respective video, wherein the condition includes a storage period of the respective video exceeding a threshold time period, wherein the storage period corresponds to a lapsed time period from at least one of the time of storage of the respective video in the system, or a time of storage of a modified version of the respective video in the system. Upon determination, the method further includes reducing the size of the respective video present in the storage device based, at least in part, on at least one of: reducing at least one quality parameter from a plurality of quality parameters of the respective video by a pre-determined decrement factor or eliminating at least one video segment of the respective video corresponding to an uneventful region of the video. The respective video with reduced size is stored as the modified version of the respective video in the storage device.

In yet another embodiment, a method for retrieving, by a remote device, at least one video stored in a storage device of a system, is disclosed. The method includes sending an access request to the system for accessing the at least one video stored in the storage device based on a unique ID of the system. The at least one video includes an event related to an important incident. The method includes receiving at least one user input related to an event. The user input includes a time range including a time of occurrence of the event, and a date of occurrence of the event. The method includes detecting, based on the user input, at least one video segment in the video including peak G-sensor values obtained from a G-sensor trace or time-series of the video within the time range. The method further includes sending the at least one video segment to the remote device.

Other aspects and example embodiments are provided in the drawings and the detailed description that follows.

BRIEF DESCRIPTION OF DRAWINGS

For a more complete understanding of example embodiments of the present technology, reference is now made to the following descriptions taken in connection with the accompanying drawings in which:

FIG. 1 illustrates an example representation of an environment related to at least some example embodiments of the present disclosure.

FIG. 2 illustrates a simplified block diagram of a DVR system for facilitating the file size reduction of stored videos and sending video segments to a remote device, in accordance with an example embodiment of the present disclosure.

FIG. 3 illustrates a flow diagram representing a method of reducing file size of the stored video in a storage device, in accordance with an example embodiment of the present disclosure.

FIG. 4 illustrates a flow diagram representing a method of reducing a file size of a stored video by reducing a quality parameter of the video, in accordance with an example embodiment of the present disclosure.

FIG. 5 illustrates a flow diagram representing a method of reducing a file size of a stored video by eliminating a video segment of the video corresponding to an uneventful region of the stored video, in accordance with an example embodiment of the present disclosure.

FIG. 6 illustrates a flow diagram representing a method of sending a video segment to a remote device, in accordance with an example embodiment of the present disclosure.

FIG. 7 illustrates an exemplary driving scenario of a vehicle driver equipped with a DVR system, in accordance with an example embodiment of the present disclosure.

FIG. 8 illustrates an exemplary video frame captured by a front view camera present in the DVR system, in accordance with an example embodiment of the present disclosure.

FIG. 9A, FIG. 9B, FIG. 9C and FIG. 9D collectively illustrate a sequential reduction of a plurality of quality parameters of a video with an exemplary video frame of the video, in accordance with an example embodiment of the present disclosure.

FIG. 10A-FIG. 10B illustrate video segments along with video frames on which process of elimination of uneventful regions of the video is performed, in accordance with an example embodiment of the present disclosure.

FIG. 11 illustrates video frames from a plurality of cameras collaged into a collaged video frame, in accordance with an example embodiment of the present disclosure.

FIG. 12 illustrates an example of a User-Interface (UI) displayed on a remote device associated with a manager for sending an access request to access the videos stored in a DVR system, in accordance with an example embodiment of the present disclosure.

FIG. 13A-FIG. 13B collectively illustrate examples of Uis displayed on the remote device for selecting and sending input regarding an occurrence of an event to the DVR system, in accordance with an example embodiment of the present disclosure.

FIG. 14A-FIG. 14B collectively illustrate examples of Uis displayed on the remote device for selecting and viewing retrieved video segments, in accordance with an example embodiment of the present disclosure.

FIG. 15 illustrates a simplified block diagram of a remote device communicating with the DVR system, in accordance with an example embodiment of the present disclosure.

The drawings referred to in this description are not to be understood as being drawn to scale except if specifically noted, and such drawings are only exemplary in nature.

DESCRIPTION OF EMBODIMENTS

In the following description, for purposes of explanation, numerous specific details are set forth in order to provide a thorough understanding of the present disclosure. It will be apparent, however, to one skilled in the art that the present disclosure can be practiced without these specific details. In other instances, systems and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The term 'video segment' refers to a part of a video which is of a fixed time range. The standard video segments are of 15 seconds to 2 minutes. The video may be an hour long and if the video is divided into video segments of 2 minutes, then the video will have 30 video segments, each of 2 minutes.

Overview

Various embodiments of the present disclosure provide methods and systems for storing videos for a longer time in a storage device by effectively reducing the size of the videos. More specifically, embodiments disclosed herein refer to a Digital Video Recorder (DVR) or a Car dashboard camera. The DVR is used to record and store videos of everyday driving scenario. A DVR set-up can be of single camera view or a combination of multiple camera views such as, but not limited to front view, rear view, driver-facing view and side-facing view. Further, the videos from these DVRs can be provided to any remote device such as, but not limited to a smartphone, a tablet, a laptop/desktop. The videos from the DVRs can be used for driver/driving management purposes. The DVR may not be limited to an automotive application and could be applicable in a surveillance, factory operation, machinery operation, etc. kind of scenario too. It could apply to any camera/network of cameras whose video has to be stored for retrieval later.

In an example embodiment, when a driver starts to drive a vehicle, the DVR associated with the vehicle starts capturing a video and the captured video is stored in a local storage of the DVR. A processor of the DVR is configured to generate metadata related to plurality of videos captured by a camera system of the DVR, the metadata such as, but not limited to, a time of storage of a video, size of a video file (hereinafter, "video file size"), multisensory data etc. The generated metadata is stored in the local storage of the DVR. Further, the processor is configured to determine conditions such as, if the video has crossed certain threshold values such as, but not limited to, a storage period of the video in the local storage exceeding a pre-set threshold storage period, a disk size of the video exceeding a pre-defined threshold disk size, a storage space left in the storage device is less than a threshold storage space, and based on the determination of these conditions, the processor facilitates reduction of the video file size of the video. The processor facilitates reduction of the video file size either by reducing at least one quality parameter of the video by a pre-determined factor or by eliminating at least one video segment of the video corresponding to an uneventful region of the video. The processor is further configured to store the video of reduced size in the place of the original video (hereinafter, "pre-stored video"). What is uneventful can be determined by at least one of engine sensory information, inertial measurement unit data, video data, etc., processed by Machine learning (ML) module present in the processor of the DVR.

The quality parameters disclosed herein can be one of: a bit rate of the video, a frame rate of the video, color/monochrome, a sub-region within the video frame, or a resolution of the video. Reduction of at least one of these quality parameters by a pre-determined factor in turn reduces the video file size. Each quality parameter is given a priority rank, and a quality parameter with lowest priority rank is reduced first and the quality parameter with highest priority rank is reduced last. Therefore, sequentially reducing at least one of the quality parameters of the video based on the priority rank enables longer storage period and lesser storage size. The processor upon the determination of the above-mentioned conditions, is configured to enable the reduction of at least one quality parameter which has a lower priority rank.

The video segment corresponding to at least one of an uneventful region disclosed herein refers to segments of the video file which can be discarded. Such uneventful region can be found based on various event-defining measuring units. The event-defining measuring units are used to determine important or unimportant events in the video. The event-defining measuring units considered to eliminate uneventful segments of the video includes at least one of: a G-sensor data trace, a number of dynamic pedestrians in the video segment, a number of dynamic vehicles in the video segment, presence of specific visible objects in the environment such as traffic signs, work zone indicators, etc., pre-defined geo-fenced regions, type of ambience and lighting conditions, visibility conditions, or amount of visual activity (motion sense) within a video frame, or a weighted audio data. The values for these event-defining measuring units are found out with the help of a plurality of sensors associated with the system. The processor is configured to receive the values for these event-defining measuring units from the system and define a set of cut-off values. Further, the processor is configured to compare a value of at least one of an event-defining measuring unit corresponding to a video segment with a first cut-off value of the set of cut-off values in a first cycle of file reduction of the video file size, and if the value of the event-defining measuring unit corresponding to the video is less than the first cut-off value, the video segment is eliminated from the storage. In the second cycle or subsequent cycle of the file reduction of the video file size, the value of the at least one of an event-defining measuring unit corresponding to a video segment is compared with a second cut-off value or the subsequent cut-off value of the set of cut-off values and if the value is less than the cut-off values the video segment is eliminated and accordingly the video file size is reduced.

In another embodiment, if a machine learning module is used to detect whether there is an eventful segment in a video or not, the multiple cut-off values could correspond to the probability, likelihood and/or confidence of the decisions output by the machine learning module.

In an example embodiment, the processor is configured to reduce the video file size of plurality of videos captured by a plurality of cameras by applying the methods of video file size reduction such as, reducing at least one quality parameter of the video by a pre-determined decrement factor or eliminating at least one video segment of the video corresponding to an uneventful region, independently to each of the camera or different methods may be applied to different cameras. In another example embodiment, if a video segment of a specific time range of the video captured by one camera is determined to be an event of interest, the processor is configured to retain the video segments corresponding to the same time range captured by the plurality of cameras. In yet another example, the video data from the plurality of cameras may be collaged into a single video snippet by the processor and encoded or deleted as a whole.

In yet another embodiment, the system facilitates retrieval of videos stored in a DVR, by a remote device from a remote location. A user at a remote location may want to retrieve video segments that include an important event present in a stored video in the local storage of the DVR. The user can be the driver of the vehicle, a vehicle owner, a car management company's employee, such as a fleet manager, claims management person at the fleet or the auto insurer or the like. The user via the remote device accesses the stored videos with the help of a unique ID and password associated with the DVR. The processor of the DVR is further configured to receive inputs from the user and retrieve video segments corresponding to the input given by the user. The input includes at least one of: an approximate time when an event occurred, a date when the event occurred, an approximate location where the event occurred and/or a scene description of the location where the event occurred. Based on these inputs, the processor is configured to send the video segments using various algorithms. In an embodiment, when the user inputs the time range when the event occurred, the processor is configured to send all the events nearest to that time range in a condensed form such as, but not limited to, a list or a thumbnail. In yet another embodiment, the processor is configured to search events around the approximate time using algorithms such as detecting and retrieving video segments that include high sensitivity marked objects, such as a pedestrian, a two-wheeler etc. In yet another embodiment, the processor detects video segments within the defined time range which includes peak values of G-sensor data. In another embodiment, the processor is configured to send a video around the given approximate time range input as a time-lapse video. In yet another embodiment the processor is configured to retrieve video segments including a scene captured at a location corresponding to the given location by the user as the input where the event occurred and provide the video segments retrieved based on the location to the remote device. In another embodiment, the processor is configured to send video segments including events based on the scene description provided by the user by using a dictionary which maps words to approximate locations, or maps words to approximate ambiance or vehicle surroundings.

It shall be noted that the description is explained using example of a vehicle driving scenario, however, the present disclosure is applicable in different applications as well, such as public surveillance, security or the like.

FIG. 1 illustrates an exemplary representation of an environment 100, related to at least some example embodiments of the present disclosure. The environment 100 is exemplarily shown including a vehicle 102, a Digital Video Recorder (DVR) system 104, a driver 106 (also referred to herein as 'a user 106'), a network 110, a remote device 112 which is present at a remote location and a manager 126 (also referred herein as 'a fleet manager'). The DVR system 104 may include plurality of components, such as but not limited to, a camera module 114, a memory 116 (also referred to as 'a storage 116'), a plurality of sensors 118, a communication interface 120 and a processor 122. Further, the components of the DVR system 104 are explained in detail in FIG. 2. The examples of the vehicle 102 may include any vehicle that can travel on the road, for example a car, a truck, a bus or the like. The vehicle 102 is equipped with the DVR system 104 and is driven by the driver 106. The DVR system 104 is exemplarily shown as mounted on the top-front of the vehicle 102.

The DVR system 104 is capable of capturing videos through at least one of a camera present in the camera module 114 and storing the videos in the memory 116. Examples of DVR system 104 may be one of a dashboard camera (hereinafter, "dashcam"), a security camera or the like. The DVR system 104 described herein is a car dashcam which starts recording the video when the driver 106 starts the vehicle 102 or alternatively video may also be recorded even when the vehicle 102 is parked. The driver 106 can select or unselect an option to capture a driving scenario from at least one of a camera from the plurality of cameras. Examples of camera module 114 may include at least one or a combination of front view camera, rear view camera, driver facing camera and side facing camera. Everyday driving scenario performed by the driver 106 is recorded and stored by the DVR system 104. The DVR system 104 is configured to reduce a file size of the video stored in the memory 116 based on a plurality of conditions. The reduction of the file size is facilitated by the processor 122 and the processor 122 utilizes plurality of data and algorithms present in the memory 116. The processor 122 includes various modules for the file size reduction, which are explained in detail in FIG. 2. The examples of sensors 118 may include, but are not limited to an inertial measurement unit/a G-sensor, a global positioning system (GPS), a proximity sensor, a speed sensor, an object detection sensor, or the like. The data from the sensors 118 is stored in the memory 116 and is utilized by the processor 122 in the process of file size reduction of the stored videos. The communication interface 120 is used to build a connection between the DVR system 104 and any remote device.

In an embodiment, a video captured by at least one of a camera present in the camera module 114 is stored in the memory 116. The processor 122 is configured to generate metadata related to each video captured by the at least one camera present in the camera module 114. The examples of metadata may include, but are not limited to, a time of storage of the video in the DVR system 104 (interchangeably referred as "DVR 104"), a file size of the video and a data from the plurality of sensors positioned in the system. The metadata corresponding to the video, generated by the processor 122 is stored in the memory 116 in association with the respective video. Further, the processor 122 determines, for each video, if a storage time period of the respective video in the DVR 104 is greater than a threshold time period or a size of the video is greater than a threshold size or the storage space left in the DVR system 104 is less than a threshold storage space. If at least one of these conditions is found to be true by the processor 122, then the processor 122 enables file size reduction of the respective video. The processor 122 is configured to reduce the file size either by reducing at least one of a quality parameter of the respective video or by eliminating at least one video segment of the respective video corresponding to an uneventful region, or a combination of both. When the respective video has been reduced to a minimum threshold quality, the processor 122 is configured to determine, if the storage time period of the video is greater than a threshold number of days. If at least one of these conditions is found to be true, the processor 122 is configured to delete the respective video. In some embodiments the respective video may be uploaded to a cloud storage before they are deleted, through the network 110.

The file size reduction of the respective video by reducing at least one quality parameter from a plurality of the quality parameters of the respective video is facilitated by the quality parameter reduction module (quality parameter reduction module 210b, refer FIG. 2) present in the processor 122 of the DVR system 104. The examples of quality parameters may include, but are not limited to a resolution, a bit rate, number of color planes, specific region of interest within the video and a frame rate of the respective video. When the processor 122 determines that at least the storage time period of the video is greater than a threshold time period or the space occupied by the video is greater than a threshold space or the storage space left in the DVR system 104 is less than a threshold storage space, the processor 122 is configured to reduce at least one quality parameter of the respective video. The quality parameter includes at least one of a bit rate of the respective video, a frame rate of the respective video, number of color planes or a resolution of the respective video or a bit rate of the respective video or a specific region of interest. In an example embodiment the processor 122 is configured to assign a priority rank to each quality parameter for sequentially reducing each video in a pre-determined sequence. After assigning the priority ranks to the quality parameters, the processor 122 upon determination that at least a storage time period of a video is greater than a threshold time period or the space occupied by the respective video is greater than a threshold space or the storage space left in the DVR system 104 is less than a threshold storage space, the processor 122 reduces a quality parameter with low priority rank before reducing a quality parameter with a high priority rank based on the pre-defined sequence.

In an example embodiment, the priority rank for the quality parameters assigned by the processor 122 may be: 1. Resolution, 2. Frame rate and 3. Bit rate. The processor 122 reduces the quality parameter of the respective video corresponding to a low priority rank. Hence, in the present example embodiment, the bit rate which has the lowest priority rank will be reduced for the respective video. Further, for the next round of file size reduction, the quality parameter with the next lowest priority rank will be reduced for the respective video. In the present example embodiment, frame rate is the quality parameter with low priority rank than resolution but high priority rank than bit rate. In an alternate embodiment, the priority rank for quality parameters can be assigned such that at least one quality parameter is never reduced for a video. The example of such a priority rank assignment by the processor 122 may be: 1. Bit rate, 2. Bit rate and 3. Resolution. In the present example embodiment, the frame rate of the respective video is never reduced by the processor 122.

The file size reduction of a respective video by eliminating at least one video segment of the video corresponding to an uneventful region of the video is facilitated by an uneventful region elimination module 210c (describes in FIG. 2) present in the processor 122 of the DVR system 104. The processor 122 is configured to define a set of cut-off values to an event-defining measuring unit. The examples of the event-defining measuring unit may include, but are not limited to, a G-sensor data, a number of dynamic pedestrians, a number of dynamic vehicles and a weight of an audio data. The audio data can be weighted based on a learning algorithm. The machine learning module 210a present in processor 210 (shown in FIG. 2) is configured to determine the cut-off values for the weights of an audio data (for example if there is lot of commotion from the audio signal then that part of the video, audio can be given higher weight). The processor 122 is configured to compare a value of the at least one event-defining measuring unit of each video segment of the respective video with a first cut-off value of the set of cut-off values determined for the at least one event-defining measuring unit, wherein the first cut-off value corresponds to a lowest cut-off value among the cut-off values of the set of cut-off values. The processor 122 is further configured to determine at least one video segment whose value of the event-defining measuring unit is less than the first cut-off value for a first cycle of the file size reduction. Further, upon determination, the processor 122 facilitates elimination of the at least one video segment of the video whose value of the at least one event-defining measuring unit is less than the first cut-off value. For subsequent cycle of file size reduction, the value of the at least one event-defining measuring unit of each video segment of the respective video is compared with the subsequent cut-off value with respect to the first cut-off value.

In an example embodiment, the event-defining measuring unit may be the G-sensor data. The processor 122 is configured to define a set of cut-off values for the G-sensor data. The set of cut-off values for the G-sensor data defined by the processor 122 may be: 0.15G, 0.25G, 0.4G and 0.5G, in the example embodiment the first cut-off value is 0.15. Further, for a respective video, the processor 122 compares the value of the G-sensor data corresponding to each video segment of the video and if the G-sensor data for a video segment is determined to be less than the first cut-off value 0.15G, the processor 122 is configured to eliminate the video segment from the video. Further for the next cycle of file size reduction, the processor 122 compares the value of G-sensor data associated with each video segment of the video with the next cut-off value. In the example embodiment the next cut-off value is 0.25G. The processor 122 is configured to perform rounds of reduction for all the cut-off values present in the set of cut-off values resulting in elimination of at least one video segment which in turn reduces the file size. The cut-offs could be done based on a percentage of a threshold set, for e.g. 10%, 30%, etc. of an actual threshold as applicable for the respective metric or data.

In an alternate embodiment, the file size reduction process may be performed by a remote server (not shown in the FIG). The remote server may include plurality of modules in the processor 122 to perform the file size reduction and be in communication with the DVR system 104 via a network 110. The communication interface 120 present in the DVR system 104 enables the DVR system 104 to connect with remote devices and servers. Meta-data could be sent to the cloud, and processing of this metadata in the cloud can be used to inform the DVR what segments to store, and/or by how much to reduce the file size.

In yet another embodiment, if an event of interest is determined in at least one video segment captured by at least one camera of plurality of cameras, then the processor 122 is configured to determine a time range of occurrence of the event of interest. The processor 122 is further configured to retain video segments captured by the remaining cameras within the determined time range. In an example embodiment, if there are videos of the same scene captured by a front view camera, rear view camera and a driver facing camera in the storage 116 and the video segment corresponding to the time range 4:00 PM to 4:02 PM captured by the front view camera is determined to be an event of interest because the dynamic objects detected in the video segment were weighted to be high, then the processor 122 will also retain the video segments captured by the rear view and driver facing camera within the time range 4:00 PM to 4:02 PM in order to have a complete information of the event of interest.

In an example embodiment the processor 122 is equipped with a file retrieval module 210d (shown in FIG. 2) in order to send a video segment corresponding to an important event to a remote device 112. In the embodiment, the driver 106 may be in contact with a manager 126. The driver 106 may provide the credentials to send an access request to the remote device 112 and the details about an important event to the manager 126. The manager 126 may be operating a remote device 112 to retrieve video segments corresponding to important events. The remote device 112 sends an access request to the DVR system 104. The access request corresponds to an access to the storage 116 of the DVR system 104. The manager 126 enters an ID and a password corresponding to the DVR system 104, and the remote device 112 is configured send an access request to the DVR system 104. Further, the access is granted automatically if the combination of ID and password is correct. The processor 122 further enables accessing at least one video stored in the local storage 116 of the DVR system 104. The processor 122 is configured to receive inputs from the remote device 112. The example of an input may include a time of occurrence of the event. Further, based on the received input, the processor 122 is configured to detect at least one video segment nearest to the given time input based on the G-sensor data and a number of dynamic objects marked with high sensitivity or importance. The video segments including of high G-sensor values or high sensitivity marked dynamic objects are marked as important events and are sent to the remote device 112 via the network 110. The video segments corresponding to important events are sent to the remote device 112 by the DVR system 104 in form of at least one of a: set of thumbnail images corresponding to the at least one video segment comprising events nearest to the time input or video segments comprising high sensitivity marked objects within the time input or video segments corresponding to the detected peaks in the G-sensor trace within the time input or video in form a time-lapse video generated from the video around the time input.

In some embodiments the video segments may be marked as video segments comprising of important events based on the audio data. The audio data is weighted based on a learning algorithm. The machine learning module 210a (shown in FIG. 2) present in the processor 122 is configured to determine the weights of an audio data. For example, if there is lot of commotion from the audio signal then that part of the video, audio can be given higher weight, and the video segment comprising of the corresponding audio data is marked to be important.

In another embodiment, only the G-sensor data corresponding to a plurality of video segments may be sent to the user instead of sending video segments. The manager 126 studies the G-sensor data associated with plurality of video segments and manually select at least one G-sensor data corresponding to a peak G-sensor data and view the video segment associated with the peak G-sensor data. Instead of only the G-sensor, an inertial measurement unit comprising of a G-sensor, a gyroscope and a magnetometer could be used. In yet another embodiment, thumbnails or time lapse video corresponding to plurality of video segments may be sent to the user instead of sending video segments. The manager 126 studies the thumbnails or the time lapse videos associated with plurality of video segments and manually selects at least one of the video segments.

In an alternate embodiment, the input received by the DVR system 104 may be of a location where the event occurred or a scene description where the event occurred to the DVR system 104. The algorithms present in the memory 116 facilitate the processor 122 to retrieve at least one video segment based on the given inputs. In an example embodiment, when the received input includes a location of occurrence of the event, the processor 122 utilizes algorithms and GPS data present in the memory 116 to detect at what time the vehicle 102 was present at that location, and the processor 122 is configured to send at least one video segment corresponding to that time. Alternatively, or additionally, if the processor 122 determines that the vehicle 102 has passed by the provided location more than once, the processor 122 is configured to request the manager 126 to provide an approximate time input. Further based on the location and the time input, the processor 122 detects at least one video segment and sends it to the remote device 112. In yet another embodiment, if the received input includes a scene description where the event occurred, the processor 122 refers a dictionary to map words to locations and uses a video summarization algorithm whose output is an image or a video thumbnail that represents the video around a scene. Further, a plurality of frames of a video segment comprising the important event are clustered, and a representative image of the cluster is sent to the remote device 112.

The file retrieval module 210d is configured to detect important video segments and send it to the remote device 112. In some embodiments, the manager 126 may want to retrieve video segments corresponding to important events and is not in connection with the vehicle 102 which is equipped with the DVR system 104. The driver 106 may contact the manager 126 to send the video segments corresponding to important events. Example of scenarios when the driver 106 may need the videos may include a collision in the near past, a false claim saying the driver 106 was at fault for a collision, a near miss where the driver 106 wants to know the scenario in detail, etc. In such scenarios, the driver 106 may contact manager 126 to search and send the video segments which are corresponding to important events that may be useful for the driver 106. Examples of the manager 126 may include, but are limited to a fleet manager, an insurance agency manager, a road collision investigator, etc. The manager 126 is designated to retrieve video segments corresponding to important events. The fleet manager 126 utilizes a unique ID and password given to every DVR 104 to access the video stored in the memory 116.

In some alternate embodiments, the video file retrieval module 210d may not be integrated to the DVR system 104 and is present at a remote location as a server system. The video file retrieval system server in communication with the DVR system 104 is capable of retrieving video segments corresponding to important events and sending it to the user 106 based on the inputs provided by the user 106.

FIG. 2 illustrates a simplified block diagram of a DVR system 200 for facilitating the file size reduction of stored videos and sending video segments to a remote device, in accordance with an example embodiment of the present disclosure.

The DVR system 200 comprises of a camera module 202, sensors 204, communication interface 206, memory 208 and a processor 210. The one or more of the components in this example may be combined or may be replaced by the processor 210. The components described herein (e.g., the communication interface 206, the processor 210, the memory 208, the camera module 202 and the plurality of sensors 204) may include hardware and/or software that are configured or programmed to perform the steps described herein. These components are further explained in detail.

The processor 210 (for example, the processor 122 shown in FIG. 1) is operatively coupled to a camera module 202 (for example the camera module 114 shown in FIG. 1) comprising of a plurality of cameras. These cameras may be mounted on a vehicle (for example the vehicle 102 shown in FIG. 1) to enable video recording from a plurality of views. The camera module 202 includes a front view camera 202a, a rear-view camera 202b, a driver facing camera 202c and a side facing camera 202d. All the cameras present in the camera module 202 are capable of capturing videos and storing them in the memory 208 (for example the memory 116 shown in FIG. 1). The driver 106 or the fleet-manager 126 may select or unselect each of the camera for the capturing and storing process. Each camera may be mounted on different areas in the vehicle, but all the cameras belong to the same DVR system 200.

The processor 210 is operatively coupled to a plurality of sensors 204 which are used to track a plurality of activities during a driving scenario. Sensors, such as but not limited to, IMU/accelerometer (G-sensor), the object detection sensors, GPS and audio sensors may be attached to the DVR system 200. These sensors record various data corresponding to the driving scenario and the data generated from the plurality of sensors is stored in the memory 208. The data from the sensors 204 is used in the method of file size reduction by eliminating video segments corresponding to uneventful regions and in the method of retrieving video segments corresponding to important events.

The processor 210 is operatively coupled to a communication interface 206 such that the system 200 is capable of communicating with a remote device, such as the remote device 112 (shown in FIG. 1) or communicates with any entity within the network 110. For example, the communication interface 206 may receive an access request from the remote device 112 for accessing videos in the memory 208 and further receive inputs regarding video segments comprising of important events. The manager 126 may send access request using a unique ID and password to communicate with the DVR system 200. Further, the communication interface 206 may be configured to receive an input regarding an important event which may be one of an approximate time when the event occurred or a date when the event occurred or an approximate location where the event occurred or a scene description where the event occurred. Based on any one of the inputs, the processor 210 detects and sends video segments corresponding to important events. The communication interface 206 may include an Ethernet interface, a radio interface, a microwave interface, or some other type of wireless and/or wired interface. The communication interface 206 may include a transmitter and a receiver. The communication interface 206 may support various wireless and/or wired protocols and standards. For example, the communication interface 206 may support Ultra WideBand (UWB) communication, Bluetooth®, Wireless Fidelity (Wi-Fi), Transport Control Protocol/Internet Protocol (TCP/IP), Institute of Electrical and Electronics Engineers (IEEE) 802.X, Wireless Application Protocol (WAP), or any other type of wireless and/or wired protocol or standard. For example, the communication interface 206 may include a transceiver device (e.g., a modem, a microwave antenna), a remote command unit interface (RCU-IF) or any other types of I/O interface.

The processor 210 is operatively coupled to the memory 208. The memory 208 is configured to store computer-programmable instructions executed by the processor 210 to perform the steps described herein. The memory 208 also stores plurality of videos captured by the camera module 202 along with their respective metadata. The memory 208 further includes algorithms/models for reducing file size and retrieving of videos. The data from the sensors 204 are also stored in the memory 208 which are useful in performing operations of the DVR system 200. The memory 208 includes an algorithm database 208a which is used to store a plurality of algorithms useful for reducing the file size by reducing at least one quality parameter of the video and eliminating at least one video segments corresponding to uneventful regions and retrieving video segments corresponding to important events. The memory 208 also includes a dictionary 208b which includes table of words mapped with the different locations present in a location database 208c. The location database 208b is used to store the location data of the vehicle 102 (refer FIG. 1). The GPS data received from the GPS sensor and the information from the dictionary 208b are further used while retrieving data from the memory 208 for mapping words to locations, based on the location or a scene description given by the manager 126. Examples of the memory 208 may include a non-removable memory and/or removable memory. The non-removable memory can include RAM, ROM, flash memory, or other well-known memory storage technologies. The removable memory can include flash memory and smart cards. In this example, the memory 208 is a chip (e.g., Integrated Circuit) based storage/memory.

The processor 210 includes a machine learning (ML) module 210a configured to facilitate the file reduction method for a plurality of videos stored in the memory 208 by executing operations, such as monitoring storage period of the respective stored videos in the memory 208, storage space left in the memory 208 and a size of the video stored in the memory 208. The processor 210 further includes a quality parameter reduction module 210b which enables the processor 210 to reduce the file size by reducing at least one quality parameter of the video. The reduction of file size by reducing the quality parameter includes assigning a priority rank to each quality parameter by the quality parameter reduction module 210b, and reducing the quality parameter corresponding to lower priority rank first and then reducing the quality parameter with higher priority rank.

The processor 210 also includes an uneventful regions elimination module 210c which enables the processor 210 to eliminate video segments corresponding to uneventful regions. The video segments corresponding to uneventful regions are determined by the processor 210 based on a set of cut-off values of event-defining measuring units defined by the uneventful regions elimination module 210c. The value of the event-defining measuring unit corresponding to a video segment is compared with the first cut-off value. If the value of the event-defining measuring unit associated with the video segment is lesser than the first cut-off value, then the video segment is eliminated. Further, the processor 210 also includes a file retrieval module 210d which enables the processor 210 to send video segments corresponding to an important event to a remote device (for example, the remote device 112 shown in FIG. 1). The file retrieval module 210d is configured to receive an access request to access the videos stored in the memory 208 and inputs regarding an important event from the remote device 112. The file retrieval module 210d is further configured to detect at least one video segment corresponding to the important event and send the at least one video segment to the remote device 112.

In an example, the processor 210 may include one or more processors, microprocessors, data processors, co-processors, network processors, application specific integrated circuits (ASICs), controllers, programmable logic devices, chipsets, field programmable gate arrays (FPGAs), and/or some other component(s) that may interpret and/or execute instructions and/or data. The processor 210 may control the overall operation of the DVR system 200 based on an operating system and/or various applications.

FIG. 3 illustrates a flow diagram representing a method 300 of reducing file size of the stored video in a storage device, in accordance with an example embodiment of the present disclosure. The operations of the method 300 are described herein with help of the processor 122. The method 300 starts at operation 302.

At operation 302 of the method 300, the processor 122 stores a plurality of videos captured by the camera module 114, in the storage 116. In an example embodiment, the camera module 114 comprises a front view camera and a rear-view camera. When the user 106 starts the vehicle 102, at least one camera of the camera module 114 starts capturing videos of the driving scenario. The videos captured by the camera module 114 are stored in the memory 116 of the DVR system 104.

At operation 304 of the method 300, the processor 122 generates metadata related to each video of the plurality of videos. The metadata includes at least one of a time of storage of a respective video or a file size of the respective video in the memory 116 and data from the plurality of sensors positioned in the system. In an example embodiment, a video stored in the storage 116 may have been stored in the storage 116 two days before, and a size of the video is 2 GB. The processor 122 generates metadata of the video accordingly and stores it in the memory 116. The processor 122 is configured to store metadata related to all the videos. Further, the metadata is utilized for file size reduction process.

At operation 306 of the method 300, the processor 122 determines for each video, at least one condition to initiate process of file size reduction for the respective video. The at least one condition comprises at least one of: a storage time period of the respective video is greater than a threshold time period or a file size of the respective video is greater than a threshold file size or the storage space left in the local storage 116 of the DVR system 104 is less than a threshold storage space. The storage time period corresponds to a lapsed time period from at least one of the time of storage of the respective video in the DVR system 104 or a time of storage of a modified version of the respective video in the DVR system 104. The modified version of the respective video corresponds to a reduced size video after performing file reduction process on the original video. In an example embodiment, if the threshold period is defined to be one day, the processor 122 determines all the videos whose storage period is greater than one day. Further, the processor 122 reduces the file size of the determined videos.

At operation 308 of the method 300, the processor 122 checks if the at least one condition is met, i.e., if the storage time period of the respective video is greater than a threshold time period or the file size of the respective video is greater than the threshold file size or the storage space left in the local storage 116 of the DVR system 104 is less than a threshold storage space. If at least one of the condition is determined to be true, the method 300 proceeds to the operation 310 otherwise, the method 300 repeats the operation 306 until one of the condition is met.

At operation 310 of the method 300, upon determination of the at least one condition, the processor 122 reduces the file size of the respective video by either reducing at least one quality parameter from a plurality of quality parameters of the respective video by a pre-determined decrement factor or by eliminating at least one video segment of the respective video corresponding to an uneventful region of the video.

The methods of reducing the file size of a video by either reducing at least one quality parameter from a plurality of quality parameters of the video by a pre-determined decrement factor and by eliminating at least one video segment of the video corresponding to an uneventful region of the video, are further explained in detail in the description.

FIG. 4 illustrates a flow diagram representing the method 400 of reducing a file size of the stored video by reducing a quality parameter of the video, in accordance with an example embodiment of the present disclosure. The method 400 starts at operation 402 and ends at operation 412.

In an example embodiment, each video has a plurality of quality parameters which decide the quality and file size of the video, for example if a video is 1 hour long with quality parameters as follows: bit rate=8 Mbps, resolution=1920× 1080 and frame rate=240 fps, the file size of this video may be approximately equal to 3.6 GB. The approximate file size can be calculated based on the formula 'file size=Bit rate× Duration'. The file size is directly proportional to quality parameters of the video and hence if the value of quality parameters is reduced, the file size reduces accordingly. In the example embodiment, if the bit rate is reduced from 8 Mbps to 4 Mbps the file size reduced by half and goes down from 3.6 GB to approximately 1.8 GB.

At operation 402 of the method 400, the processor 122 determines a decrement factor to reduce at least one quality parameter from a plurality of quality parameters of the respective video. The examples of quality parameters may include, but are not limited to, a resolution, a bit rate a frame rate, color-planes etc. The decrement factor decides the amount by which a quality parameter of the video has to be reduced. In some embodiments, the color format of the video may also be considered as a quality parameter. If the user needs less details in color, the color format of the video can be reduced.

At operation 404 of the method 400, the processor 122 assigns a priority rank to each quality parameter for sequentially reducing each of the plurality of quality parameters of the video in a pre-determined sequence. This priority rank may be assigned by a person of authority such as a fleet manager for e.g. on a portal. A video is reduced in size multiple times till the video size or quality is reduced to a pre-defined threshold size, hence the method of reduction of file size of the videos is a multi-cycle process. Accordingly, for the first cycle, the quality parameter with a lower priority rank will be reduced before a quality parameter with a higher priority rank. For example, the priority rank for the quality parameters assigned by the processor 122 may be: 1. Resolution, 2. Frame rate and 3. Bit rate. In the present example, the bit rate of the video has the lowest priority rank, hence the bit rate of the video will be reduced first and next the frame rate and so on.

In an alternate or additional embodiment, the priority rank is assigned to the plurality of quality parameters in such a way that at least one quality parameter is never reduced in the process of file size reduction. For example, the priority rank to the quality parameters may be assigned in such a way that at least one quality parameter is not present in the priority list. An example of such a priority rank assignment can be: 1. Bit rate, 2. Bit rate, 3. Resolution. In this assignment, the frame rate of the video is never reduced in the file size reduction process.

At operation 406 of the method 400, the processor 122 reduces the quality parameter with a low priority rank before reducing the quality parameter with high priority rank. The reduction process is performed for a plurality of cycles.

In an example embodiment, the bit rate which has the lowest priority rank will be reduced for the respective video. Further, for the next cycle of file size reduction, the quality parameter with the next lowest priority rank will be reduced for the respective video. In the example embodiment, frame rate is the quality parameter with least priority rank. Further, when the processor 122 further determines that, for the respective video, the storage time period is greater than the threshold time period or the disk space is greater than the threshold disk space or the storage space left in the storage device is less than the threshold storage space, the processor 122 reduces the frame rate of the respective video.

At operation 408 of the method 400, the processor 122 determines whether a file size of the respective video is reduced to a pre-defined threshold size, i.e., the file size of the respective video is less than the pre-defined threshold size. At operation 410, if it is determined that the file size of the respective video is less than the pre-defined threshold size, then the method 400 proceeds to operation 412 otherwise, the method 400 returns to operation 408. At operation 412 of the method 400, the processor 122 determines whether a storage period of the video file is greater than the threshold time period. At operation 414, if it is determined that the storage period of the video file is greater than the threshold time period, the method 400 proceeds to operation 416 otherwise returns to operation 412.

At operation 416 of the method 400, upon determination that the file size of the respective video is lesser than the pre-defined threshold size and the storage period of the respective video is greater than the threshold time period, the processor 122 deletes or transfers the video file from the storage 116 of the DVR system 104. For example, if the threshold time period for storage period is 4 days and it is determined that the storage period of a video has crossed 4 days and the size of the video is reduced to the pre-defined threshold value i.e. 100 MB, the video is deleted from the memory 116 of the DVR system 104. In an alternate embodiment, the video file can be uploaded to a networked storage before it is deleted from the storage 116.

FIG. 5 illustrates a flow diagram of a method 500 of reducing file size of a stored video by eliminating a video segment of the video corresponding to an uneventful region of the stored video, in accordance with an example embodiment of the present disclosure.

At operation 502 of the method 500, the processor 122 defines a set of cut-off values for at least one event-defining measuring unit for the respective video. The examples of the event-defining measuring unit may include, but are not limited to, a G-sensor data, a number of dynamic pedestrians, a number of dynamic vehicles, a presence of an object marked as highly sensitive, presence and count of specific types objects in the scene, such as traffic signs, traffic lights, work zone signs, etc., and weights of an audio data. This set will contain a set of values defined for at least one of the quality parameters and these cut-off values are used to eliminate video segments of the video. For example, the set of cut-off values for the G-sensor data defined by the processor 122 includes: 0.15G, 0.25G, 0.4G and 0.5G wherein the first cut-off value is 0.15G. Similarly, the set of cut-off values can be defined for each even-defining measuring unit such as number of pedestrians (2, 5, 8, and 10), a number of two-wheeler vehicles (1, 3, 5, and 6) and so on. Similarly, the set of cut-off values can be defined for a traffic speed sign as the value of the speed limit (less than 25 miles per hour, 35 miles per hour etc.). The operations 504-510 are performed post determining occurrence of the at least one condition described in the FIG. 1 (i.e., if the storage time period of the respective video is greater than a threshold time period or the file size of the respective video is greater than the threshold file size or the storage space left in the local storage 116 of the DVR system 104 is less than a threshold storage space) for reducing the file size of the respective video.

At operation 504 of method 500, the processor 122 compares a value of at least one event-defining measuring unit corresponding to each video segment of the video with a first cut-off value of the set of cut-off values. The first cut-off value is the lowest cut-off value among the set of cut-off values. In the example embodiment disclosed for the step 502, the processor 122 compares the value of the G-sensor data corresponding to each video segment of the video with the first cut-off value which is 0.15G.

At operation 506 of the method 500, the processor 122 determines at least one video segment whose value of the at least one event-defining measuring unit is less than the first cut-off value of the set of cut-off values. The video segment whose value of the at least one event-defining measuring unit is less than the first cut-off value of the set of cut-off values is considered as the video segment comprising uneventful region of the respective video.

At operation 508 of the method 500, the processor 122 eliminates the at least one video segment from the respective video whose value of the event-defining measuring unit is less than the first cut-off value. For example, if the G-sensor data for a video segment is determined to be less than the first cut-off value 0.15G, the processor 122 is configured to eliminate the video segment from the video. The file size of the video will be reduced as a result of the elimination. Further, the operations 408-416 can be performed for the method 500 in order to delete or upload the minimal sized video.

FIG. 6 illustrates a flow diagram of a method 600 of sending a video segment, to a remote device 112, stored in a storage 116 of the DVR system 104, in accordance to an example embodiment of the present disclosure. The method of sending the video segment requires an interference of the manager 126 associated with the remote device 112. The manager 126 uses a remote device 112, examples of which may include a smartphone, a laptop/desktop or the like to communicate with the DVR system 104. The manager 126 may access file retrieval application on the remote device 112 through a user interface (UI), such as a web browser and various application interfaces (APIs).

At operation 602 of the method 600, the processor 122 receives an access request from the remote device 112 for accessing videos stored in the storage 116. The manager 126 inputs an ID and password associated with the DVR system 104, provided by the driver 106. The processor 122 is configured to receive an access request and automatically grant an access if the combination of the ID and password input by the manager 126 is correct. The access grant corresponds to a grant to access the videos stored in the DVR system 104.

At operation 604 of the method 600, post giving the access to the storage 116, the processor 122 receives, from the manager 126, at least one information (also referred as "user input") regarding an important event. The information may include but is not limited to, an approximate time of the occurrence of the event, a date when the event occurred, an approximate location where the event occurred or a scene description where the event occurred. Based on any one of the information provided by the manager 126 the processor 122 is configured to detect and send the video segments corresponding to the important events.

At operation 606 of the method 600, the processor 122 detects at least one video segment of the video comprising the event based on the at least one information. The information provided by the manager 126 may be an approximate time when the event occurred, the processor 122 is configured to detect video segments nearest to the given approximate time. In an example embodiment, the manager 126 may input approximate time input as 4:30 PM and the event might have actually occurred at 4:42 P.M., therefore for optimal retrieval of only important and eventful portion of the video, the processor is configured to detect events based on various parameters such as, but not limited to, G-sensor data, number dynamic objects, etc. The processor 122 detects a plurality of video segments nearest to the given approximate time input. The video segments present within a time range defined based on the received time input are extracted by the processor 122. For example, for the time input as 7:30 P.M. the video segments within time range (7:15 P.M.-7:45 P.M.) will be extracted. Post extraction, the processor 122 determines high G-sensor values of each video segment of the extracted video segments based on the G-sensor data trace generated by using the G-sensors. The video segments including high G-sensor values are retained and remaining video segments are discarded. The video segment with high G-sensor value are considered to be containing important information related to the event.

At operation 608, the processor 122 sends the at least one detected video segment to the remote device 112. For example, the video segments of high G-sensor values are sent to the remote device 112. In an example embodiment, the video segments can be sent to the manager 126 in a plurality of ways. The plurality of videos segments can be sent to the remote device 112 in a set of thumbnails corresponding to the video segments including important information of the event or other condensed forms to reduce bandwidth for transferring of the videos to the remote device 112. In another embodiment, the video segments nearest to the time input, comprising of high sensitivity marked objects may be sent to the remote device 112. The examples of high sensitivity marked objects may include but are not limited to, pedestrians, and two wheelers. In yet another embodiment, a plurality of video segments around the given time input may be made into a time-lapse video and sent to the remote device 112.

In an alternate embodiment, the manager 126 may provide, via the remote device 112, details of a location where the event occurred or a scene description where the event occurred. The algorithms present in the memory 116 facilitate the processor 122 to retrieve at least one video segment based on the given location. In an example embodiment, when the manager 126 provides input of the location, the machine learning module 210a (as shown in FIG. 2) present in the processor 122 utilizes algorithms and GPS data present in the memory 116 to detect at what time the vehicle 102 was present at that location, and the processor 122 is configured to send at least one video segment corresponding to that time. In case if the processor 122 determines that the vehicle 102 has passed by the provided location more than once, the processor 122 is configured to request the manager 126 to provide, via the remote device 112, an approximate time input. Based on the location and the time input, the processor 122 detects at least one video segment and sends it to the remote device 112. In yet another embodiment if the manager 126 provides a scene description of where the event happened, the processor 122 uses a dictionary (for example, the dictionary 208b of FIG. 2) to map words to locations and an algorithm called video summarization algorithm. The output of the video summarization algorithm is an image or a video thumbnail that represents the video around a scene. The frames of a video segment are clustered, and a representative image of the cluster based on at least a number of dynamic objects or a high G-sensor value is sent to the remote device 112.

FIG. 7 illustrates an example representation of a driving scenario 700, of the driver 106 driving the vehicle 102 equipped with the DVR system 104. The DVR system 104 comprises a camera module 114 including a plurality of cameras such as front view camera, rear view camera, driver facing camera, etc. In an example illustration shown in the FIG. 1 the front view camera capturing the driving scenario of the vehicle 102 is shown. The front view camera of the DVR 104 has a Field of View (FOV) 701. The field of view is the area which the camera can capture and anything outside of the FOV 701 cannot be captured by the camera. Further in the example illustration, two pedestrian 702 and 704, and a four-wheeler 706 are exemplarily shown to be present in the FOV 701 of the front view camera. Further, a two-wheeler 708 is present outside the FOV 701 of the front view camera. The DVR system 104 is not just limited to capture and store videos but is equipped with a plurality of sensors 204, such as G-sensors, object detecting sensors, speed sensors, GPS, etc. The plurality of sensors enables the DVR system 104 to record plurality of other parameters, such as G-sensor traces, number of dynamic pedestrians, number of dynamic vehicles, audio data etc. The data recorded from sensors 204 are used in the methods of elimination video segments of a video and retrieval of video segments corresponding to important events of the video.

FIG. 8 is an example illustration of a video frame 800 of a video captured by the front view camera (shown in the FIG. 7) present in the camera module 114 of the DVR system 104 mounted on the vehicle 102. The video consists of a plurality of video frames and one of the frames is exemplarily shown in the illustration. The video frame includes two pedestrian 806a, 806b and a four-wheeler 804. Picture quality of the video depends on the quality parameters of the video. Higher the value of the quality parameters, the higher is the quality of the video. The quality parameters of the video are shown at the upper left corner of the video frame. The quality parameters of the video corresponding to the example are bit rate, resolution and frame rate. Each of these quality parameters have a value that determines the video quality and the video file size. In the example embodiment, the value for the quality parameters are bit rate=8 Mbps, resolution=1920×1080 and frame rate=120 fps.

FIGS. 9A, 9B, 9C and 9D collectively illustrate a sequential reduction of a plurality of quality parameters of a video with an exemplary video frame of the video, in accordance with an example embodiment of the present disclosure. The method of reducing a video file size by reducing at least one quality parameter of the video is exemplarily shown with the same video frames of the video after every cycle of reduction.

Now referring to FIG. 9A, the video frame 900 is an example of a video frame of a video as initially stored in a storage device i.e. the original video. It shall be noted that none of the quality parameters have been reduced for the video when it is initially stored. The quality parameters and their respective values corresponding to the video are exemplarily shown in the upper left corner of the video frame 900. The bit rate 908, the resolution 910 and the frame rate 912 are the quality parameters of the video. In an example embodiment, initially the bit rate 908 may have a value equal to 8 Mbps, the resolution 910 may have a value equal to 1920×1080 and the frame rate may have a value equal to 240 fps. The size of the video is exemplarily shown at the upper right area of the video frame 900. In the example embodiment, the file size 914 of the video may be 4 GB. Further in the example embodiment, if the video has crossed a threshold storage period or a threshold file size or the storage space left in the DVR system 104 is less than the threshold storage space, the processor 122 is configured to reduce at least one quality parameter of the video.

Now referring to FIG. 9B, the video frame 902 is an example of a video frame of the respective video after a first round of sequential reduction. The quality parameters and their respective values corresponding to the video are exemplarily shown in the left upper corner of the video frame 902. The bit rate 908, the resolution 910 and the frame rate 912 are the quality parameters of the video. In an example embodiment, after the first round of sequential reduction, the at least one quality parameter, i.e., the bit rate 908 (shown in FIG. 9A) is reduced by half and may have a value equal to 4 Mbps as the updated bit rate, such as bit rate 916 of the respective video. The resolution 910 may have a value equal to 1920×1080 and the frame rate may have a value equal to 240 fps. The size of the video is reduced by half, which exemplarily shown at the upper right of the video frame 902. In the example embodiment, the new file size 918 of the video is reduced file size of 2 GB. The video is modified and saved in place of the previously saved video (i.e. the original video).

Now referring to FIG. 9C, the video frame 904 is an example of a video frame of a video after a second round of sequential reduction. The quality parameters and their respective values corresponding to the video are exemplarily shown in the upper left corner of the video frame 904. The bit rate 916, the resolution 910 and the frame rate 912 are the quality parameters of the video frame 904 before size reduction. In an example embodiment, after the second round of sequential reduction, the bit rate 908 may have a value equal to 2 Mbps, the resolution 910 may be reduced to have a value equal to 640×480 as the updated resolution 920 and the frame rate 912 may have a value 240 fps. The size of the video is exemplarily shown at the upper right of the video frame 904. In the example embodiment, the new file size 922 of the video is a reduced file size of 1 GB from the previous file size of 2 GB (with respect to FIG. 9B). The video is modified and saved in place of the previously saved video. As shown in FIGS. 9A and 9B the video size is subsequently reduced by reducing one quality parameter at a time.

Now referring to FIG. 9D, the video frame 906 is an example of a video frame of a video after a third round of sequential reduction. The quality parameters and their respective values corresponding to the video are exemplarily shown in the left bottom corner of the video frame 906. The bit rate 916, the resolution 920 and the frame rate 912 are the quality parameters of the video frame 906 before size reduction. In an example embodiment, after the third round of sequential reduction, the bit rate 916 may be reduced to have a value equal to 1 Mbps as updated bitrate 924, the resolution 920 may have a value equal to 640×480 as taken from FIG. 9C and the frame rate 912 may have a value 240 fps. The size of the video is exemplarily shown at the right bottom of the video frame 906. In the example embodiment, the new file size 926 of the video is reduced to 0.5 GB. The video is modified and saved in place of the previously saved video. Further in an example embodiment, the processor 122 may determine that the video has a file size lesser than a threshold file size and delete the video or upload the video to a networked storage before deleting the video.

FIGS. 10A and 10B are example illustrations 1000 and 1002 of video segments along with video frames on which process of elimination of uneventful regions of the video is performed, in accordance with an example embodiment of the present disclosure. A video consists of plurality of video segments. A video segment may be of 15 seconds to 2 minutes long. In a video some video segments may be eventful, and some may be uneventful. The uneventful video segments can be deleted from the video in order to reduce the size of the video.

Now referring to FIG. 10A, the video 1000 consists of two video segments Vseg1 1004a and Vseg2 1004b. Each video segment has plurality of video frames. In the example illustration the video segment Vseg1 1004a is shown exemplarily to have four video frames 1006a, 1006b, 1006c and 1006d. Further, the video segment Vseg2 1004b is shown exemplarily to have four video frames 1008a, 1008b, 1008c and 1008d. The size 1010 of the video 1000 is exemplarily shown to be the sum of the sizes of individual video segments. The size of the video segment Vseg1 1004a is shown to be X GB and the size of the video segment Vseg2 1004b is shown to be Y GB. Therefore, the size 1010 of the video 1000 may be (X+Y) GB. In an example embodiment, if the size of two video segments are 1 GB and 1.5 GB, then the size of the video comprising of respective video segments will be equal to 2.5 GB (1 GB+1.5 GB).

Further the video frames 1006a, 1006b, 1006c, 1006d, 1008a, 1008b, 1008c and 1008d are magnified exemplarily to show the scene of the video segments Vseg1 1004a and Vseg2 1004b in detail. It is to be noted that the scene depicted in the frames 1006a, 1006b, 1006c and 1006d is dynamic and the scene depicted in the frames 1008a, 1008b, 1008c and 1008d is static. In an example embodiment, dynamic scene may correspond to the vehicle moving at a certain speed and suddenly decelerating and static scene may correspond to the vehicle halting at a traffic signal and waiting for the traffic lights to turn green. In such an embodiment, the video segment comprising of video frames associated with a static scene may be deleted by the processor 122 and the video segment comprising of video frames associated with a dynamic scene may be preserved. The video frames of the video segment Vseg1 1004a are shown to have a car 1012a (for example the car 804 shown in FIG. 8), a pedestrian 1012b (for example the pedestrian 806a shown in FIG. 8) and another pedestrian 1012c ((for example the pedestrian 806b shown in FIG. 8). The car 1012a, the pedestrians 1012b and 1012c are dynamic in the video segment Vseg1 1004a and the movement of the car 1012a, the pedestrians 1012b and 1012c are exemplarily shown in the video frames 1006a-1006d. Similarly, the video frames of the video segment Vseg2 1004b is shown to have another cars 1014a and 1014b which are static in the video segment. The four-wheelers 1014a and 1014b does not change its position in the video segment Vseg2 1004b and is exemplarily shown halting at a traffic signal in all the video frames 1008a-1008b. In the example illustration, the video segment Vseg2 1004b may be deleted by the processor 122 because it comprises of video frames 1008a, 1008b, 1008c and 1008d associated with a static scene. The total size 1010 of the video 1000 will be reduced by Y GB.

Now referring to FIG. 10B, the video 1002 comprises of only one video segment Vseg1 1004a and the size 1010 of the video 1002 is exemplarily shown to be X GB. The video 1002 is a resulting video after the video 1000 has undergone a file size reduction based on the method of eliminating video segments corresponding to uneventful regions of the video. In the example embodiment, the size 1010 of the video 1000 was said to be 2.5 GB (1 GB+1.5 GB), now after eliminating the video segment Vseg2 1004b, the size 1010 of the video 1002 may be equal to 1 GB (2.5 GB−1.5 GB).

FIG. 11 is an example illustration 1100 of video frames from a plurality of cameras collaged into a collaged video frame, in accordance with an example embodiment of the present disclosure. In some embodiments, the user can select plurality of cameras to record videos of a driving scenario. In an example embodiment, when there are videos from plurality of cameras, the methods of reducing video file size either by reducing at least one of a quality parameter of a video or by eliminating at least one video segment of a video corresponding to an eventful region can be applied independently to each of the cameras present. In an alternate embodiment, different methods can be applied to different cameras. In the example illustration 1100, the embodiments depict four different video frames from four different cameras being collaged into a collaged video frame. The four different video frames shown are V1 1102, V2 1104, V3 1106 and V4 1108 belong to four different video segments captured from a plurality of cameras. Video frames V1 1102, V2 1104, V3 1106 and V4 1108 exemplarily collaged into a collaged video frame Vcoll 1110. The processor 122 is configured to collage video segments captured from plurality of cameras and the collaged video may be called a video snippet. The video snippet may be either reduced to a smaller file size or deleted from the memory 116. The importance of the video snippet will be equal to a weighted combination of the importance of each video segment present in the collage. Based on the weighted combination of importance, the collaged video snippet will be encoded to reduce the file size as an independent video or will be deleted from the memory 116. The importance of a single video segment depends on the value corresponding to at least one of an event-defining measuring unit. In an example embodiment, the event defining measuring unit may be G-sensor data of a video segment. If the G-sensor data of the video segment is high, the importance of that video segment is weighted to be high. In the example illustration, the final weighted importance of the video snippet Vs 1110 may be the weighted combination of importance the video segments including the video frames V1 1102, V2 1104, V3 1106 and V4 1108. Further, based on the weighted combination of importance, the processor 122 either encodes the video snippet Vs 1110 to reduce its file size or deletes the video snippet Vs 1110 from the memory 116.

FIGS. 12-14 are illustrations of user interface (UI) provided on the remote device 112 to retrieve video segments corresponding to important events stored in the DVR system 104. The manager 126, via the UI displayed on the remote device 112, enters a unique ID and password to send an access request the DVR system 104 for accessing videos stored in the DVR system 104. Further, the manager 126 may provide via the UI displayed on the remote device 112, at least one input corresponding to a video segment comprising of an important event such as an approximate time when the event occurred or a date when the event occurred or an approximate location where the event occurred or a scene description where the event occurred. The manager 126 may use a file retrieval application or a website through User Interfaces (Uis) on the remote device 112 to retrieve video segments. The Uis displayed to the manager are further explained in detail.

FIG. 12 illustrates an example UI 1200 of a file retrieval application 1202 for entering DVR ID and password to send an access request to the DVR system 104 from the remote device 112 to access the video files stored in the respective DVR system 104. The text box 1204 corresponds to user input field to enter the DVR ID. The textbox 1206 corresponds to another user input field to enter the password associated with the DVR ID. The password is used to maintain security of files stored in the DVR system 104. Further, after entering the password the manger may send an access request to the respective DVR system 104 by clicking on the 'send access request' button 1208. The access is achieved by the user only if the DVR ID and password matches with the pre-stored DVR ID and password in the DVR system 104. Post getting an access to the videos in the memory 116, the manager may search for video segments corresponding to important events by providing inputs. The inputs that can be provided by the manager are further explained in detail.

FIGS. 13A and 13B collectively illustrate examples of Uis displayed on the remote device for selecting and sending input regarding an occurrence of an event to the DVR system, in accordance with an example embodiment of the present disclosure.

FIG. 13A illustrates an example UI 1300 of a file retrieval application 1202 for providing input related to an event that has occurred, in order to retrieve video segment corresponding to the event. A heading "DVR number: 1234" 1302 exemplarily shows the DVR ID associated with the DVR system 104 from which the manager 126 wants to retrieve video segments. Further, a message 'Provide input to the DVR system' 1304 is displayed indicating the manager 126 to provide at least one information corresponding to an event that has occurred. The options 1306, 1308, 1310 and 1312 are active click buttons and corresponds to the different options of input that the manager can provide to the DVR system 104. The selectable buttons are labeled as "Approximate time of the event occurrence" 1306, "date of occurrence" 1308, "location where the event occurred'" 1310 and "scene description where the event occurred" 1312. The manager 126 can choose any one of the buttons from the four selectable buttons and provide the input to the DVR system 104 accordingly.

Now referring to FIG. 13B, the example UI illustration 1320 depicts that the manager 126 has chosen to input approximate time by choosing the button 1306 "Approximate time of event occurrence". The server displays an UI for the manager to input the time. The heading 1302 "DVR number: 1234" exemplarily shows the DVR ID associated with the DVR system 104. Further, a message "Input approximate time of event occurrence" 1314 is displayed on a display screen of the remote device 112 to inform the manager 126 to input the approximate time when the event occurred. Further, there is an input field 1316 which allows the user to input the hours, minutes and AM/PM values. In an example embodiment, if the manager remembers that the event has occurred somewhere around 07:30 PM, the user can use the input field to input hours as 07, minutes as 30 and select PM from the AM/PM drop-down button. Further, a click button labeled as "Send" 1318 allows the manager 126 to send the time input to the DVR system 104. After, the manager 126 inputs time and clicks on the "Send" button 1318, the processor 122 in the DVR system 104 is configured to receive the input and detect the events based on the input. It shall be noted that the example is taken with respect to input being an approximate time input, however it shall be understood that the similar process of communicating information between the remote device 112 and the DVR system 104 can be performed for another types of inputs as well.

FIGS. 14A and 14B collectively illustrate examples of UI is displayed on the remote device for selecting and viewing retrieved video segments, in accordance with an example embodiment of the present disclosure.

FIG. 14A illustrates an example UI 1400 of the plurality of buttons being displayed on the display screen of the remote device 112 after the processor 122 has completed the searching for video segments corresponding to the approximate time input given by the manager 126. A message "How do you wish to see the results?" 1402 is displayed to the manager 126 on the display screen of the remote device 112. Another message "given approximate time of event occurrence: 07:30 PM" 1404 indicates that the input given was an approximate time of 07:30 PM. Further, the plurality of selectable buttons "a set of thumbnails near the time input" 1406a, "video segments nearest to the time input with high sensitivity marked objects" 1406b, "video segments nearest to the time input corresponding to high G-sensor values" 1406c and "a time-lapse video around the time input" 1406d are displayed to the manager 126 on the remote device 112. The manager 126 can select any one of the buttons or more than one button to view the video segments he/she desires. For example, the manager 126 may choose to see the video segments nearest to the time input corresponding to high G-sensor values by clicking on the button "video segments nearest to the time input corresponding to high G-sensor values" 1406c. Further, after the manager 126 chooses at least one of the buttons, the processor 122 in the DVR system 104 is configured to send video segments based on the manager's selection. In the example embodiment, the processor 122 sends video segments nearest to the time input corresponding to high G-sensor values to the manager. The UI for displaying video segments based on the manager's selection is explained further in detail.

FIG. 14B illustrates an example UI 1430 of the video segments retrieved by the processor 122 based on manager's input and selection being displayed on the display screen of the remote device 112. The message "video segments nearest to the time input corresponding to high G-sensor values" 1408 indicates that the video segments being displayed are the video segments correspond to high G-sensor values within the given time input provided by the manager 126. The videos are displayed in a list view with a representative image of each video segment displayed on the display screen of the remote device 112 with the time of occurrence of the video segment shown below the representative image and the G-sensor trace corresponding to each of the video segments displayed to the left of the representative image of each video segment.

The representative images for video segments 1412a, 1412b and 1412c are displayed indicating three video segments corresponding to high G-sensor values found within the time input. The G-sensor traces 1410a, 1410b and 1410c are displayed to the left side of the representative images 1412a, 1412b and 1412c. The time durations 1414a, 1414b and 1414c are displayed below every video segment indicating the time range of occurrence of the corresponding video segment. The representative images 1412a, 1412b and 1412c are configured as selectable icons and the user can select any one of the representative images to play the corresponding video segment.

The G-sensor traces have acceleration as their y-axis attribute and time range as their x-axis attribute. The acceleration and deceleration corresponding to a time range is shown by the traces. The time segments with peak G-sensor values are weighted to be important and may videos corresponding to important events. In the example illustration. In the representative image 1412a, a speed breaker 1420 is shown which caused change in the speed and acceleration of the vehicle 102 and the time range corresponding to the video segment for the representative image 1412a is shown to be 7:42 to 7:43 PM. The G-sensor trace 1410a corresponding to the representative image 1412a is shown to have peak G-sensor values at the time range 7:42-7:43 indicating that the vehicle 102 has undergone sudden change in the acceleration. Similarly, in the representative image 1412b a pedestrian 1418 crossing the road in front of the vehicle 102 is shown and the time range corresponding to the video segment associated with the representative image 1412b is shown to be 7:30 to 7:32 PM. The G-sensor trace 1410b corresponding to the representative image 1412b is shown to have peak G-sensor values at the time range 7:30-7:32 PM indicating that the vehicle 102 has undergone sudden change in the acceleration. Similarly, in the representative image 1412c the vehicle 102 overtaking another vehicle 1422 and a two-wheeler 1416 is heading towards the vehicle 102 from the opposite side is shown, and the time range corresponding to the video segment associated with the representative image 1412c is shown to be 7:39 to 7:40 PM. The G-sensor trace 1410c corresponding to the representative image 1412c is shown to have peak G-sensor values at the time range 7:39-740 PM indicating that the vehicle 102 has undergone sudden change in the acceleration.

In an alternate embodiment, the traces corresponding to the number dynamic objects along with the corresponding video segments may be displayed on the display screen of the remote device 112 instead of the G-sensor traces. The higher the number of dynamic objects, higher is the importance of the video. Hence, based on the traces corresponding to the number of dynamic objects the manager 126 may find the desired video segment corresponding to an important event. In another embodiment, the manager 126 may provide location where the event occurred, date when the event occurred or the scene description where the event occurred as an input to the DVR system 104. Accordingly, the processor 122 of the DVR system 104 is configured to receive these inputs, and extract and send video segments based on the received input from the remote device 112.

In an alternate embodiment, the file retrieval system may not be integrated with the DVR system 104. The File retrieval system may be present at a remote location and the manager may directly operate the file retrieval system server to send access requests and receive inputs from the driver and send the videos to the driver.

FIG. 15 shows a simplified block diagram of a remote device for example a mobile phone 1500 capable of implementing the various embodiments of the present disclosure. The remote device 1500 may be an example of user device 1015. In an embodiment, the various operations related to remotely retrieving important video segments from a storage device of a system can be facilitated using a file retrieval application 1506 (standalone application) installed in the mobile phone 1500.

It should be understood that the mobile phone 1500 as illustrated and hereinafter described is merely illustrative of one type of device and should not be taken to limit the scope of the embodiments. As such, it should be appreciated that at least some of the components described below in connection with that the mobile phone 1500 may be optional and thus in an example embodiment may include more, less or different components than those described in connection with the example embodiment of the FIG. 15. As such, among other examples, the mobile phone 1500 could be any of a mobile electronic devices or may be embodied in any of the electronic devices, for example, cellular phones, tablet computers, laptops, mobile computers, personal digital assistants (PDAs), mobile televisions, mobile digital assistants, or any combination of the aforementioned, and other types of communication or multimedia devices.

The illustrated mobile phone 1500 includes a controller or a processor 1502 (e.g., a signal processor, microprocessor, ASIC, or other control and processing logic circuitry) for performing such tasks as signal coding, data processing, image processing, input/output processing, power control, and/or other functions. An operating system 1504 controls the allocation and usage of the components of the mobile phone 1500 and support for one or more applications programs (see, file retrieval application 1506). The file retrieval application 1506 may include common mobile computing applications (e.g., web browsers, messaging applications) or any other computing application.

The illustrated mobile phone 1500 includes one or more memory components, for example, a non-removable memory 1508 and/or removable memory 1510. The non-removable memory 1508 and/or removable memory 1510 may be collectively known as database in an embodiment. The non-removable memory 1508 can include RAM, ROM, flash memory, a hard disk, or other well-known memory storage technologies. The removable memory 1510 can include flash memory, smart cards, or a Subscriber Identity Module (SIM). The one or more memory components can be used for storing data and/or code for running the operating system 1504 and the file retrieval application 1506. The mobile phone 1500 may further include a user identity module (UIM) 1512. The UIM 1512 may be a memory device having a processor built in. The UIM 1512 may include, for example, a subscriber identity module (SIM), a universal integrated circuit card (UICC), a universal subscriber identity module (USIM), a removable user identity module (R-UIM), or any other smart card. The UIM 1512 typically stores information elements related to a mobile subscriber. The UIM 1512 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The mobile phone 1500 can support one or more input devices 1520 and one or more output devices 1530. Examples of the input devices 1520 may include, but are not limited to, a touch screen/a display screen 1522 (e.g., capable of capturing finger tap inputs, finger gesture inputs, multi-finger tap inputs, multi-finger gesture inputs, or keystroke inputs from a virtual keyboard or keypad), a microphone 1524 (e.g., capable of capturing voice input), a camera module 1526 (e.g., capable of capturing still picture images and/or video images) and a physical keyboard 1528. Examples of the output devices 1530 may include but are not limited to a speaker 1532 and a display 1534. Other possible output devices can include piezoelectric or other haptic output devices. Some devices can serve more than one input/output function. For example, the touch screen 1522 and the display 1534 can be combined into a single input/output device.

A wireless modem 1540 can be coupled to one or more antennas (not shown in the FIG. 15) and can support two-way communications between the processor 1502 and external devices, as is well understood in the art. The wireless modem 1540 is shown generically and can include, for example, a cellular modem 1542 for communicating at long range with the mobile communication network, a Wi-Fi compatible modem 1544 for communicating at short range with an external Bluetooth-equipped device or a local wireless data network or router, and/or a Bluetooth-compatible modem 1546. The wireless modem 1540 is typically configured for communication with one or more cellular networks, such as a GSM network for data and voice communications within a single cellular network, between cellular networks, or between the mobile phone 1500 and a public switched telephone network (PSTN).

The mobile phone 1500 can further include one or more input/output ports 1550, a power supply 1552, one or more sensors 1554 for example, an accelerometer, a gyroscope, a compass, object detecting sensors, or an infrared proximity sensor for detecting the orientation or motion of the mobile phone 1500, a transceiver 1556 (for wirelessly transmitting analog or digital signals) and/or a physical connector 1560, which can be a USB port, IEEE 1394 (FireWire) port, and/or RS-232 port. The illustrated components are not required or all-inclusive, as any of the components shown can be deleted and other components can be added.

Without in any way limiting the scope, interpretation, or application of the claims appearing below, a technical effect of one or more of the example embodiments disclosed herein is to provide methods and systems for effectively storing videos in a storage device, more particularly to, methods and systems for storing videos in a local storage of a Digital Video recorder (DVR) and automatically reducing the file size of the videos to effectively store the important videos for a longer duration. The embodiments facilitate the storage of videos in a more intelligent and effective manner by using machine learning algorithms without any human interaction. The embodiments of the present disclosure also facilitate retrieval of video segments corresponding to important events from a remote device. The remote device is facilitated with a file retrieval application which renders a User Interface (UI) to communicate with the DVR system. With the help of the application, the user can retrieve desired video segments corresponding to important events from any remote location. Further the retrieved videos can be used for:

submitting as an evidence regarding an incident in a dispute settlement or a case hearing in court.

checking who was at fault and what went wrong, in an incident.

driver and driving management based on the videos

Hence, the present disclosure helps in storing videos in a local storage device for a longer duration and retrieve video segments stored in the local storage from by a remote device from any remote location with minimal human intervention.

The disclosed methods with reference to FIGS. 1 to 15, or one or more operations of the flow diagrams 300, 400, 500 and 600 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Although the disclosure has been described with reference to specific exemplary embodiments, it is noted that various modifications and changes may be made to these embodiments without departing from the broad spirit and scope of the disclosure. For example, the various operations, blocks, etc. described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry)

Particularly, the DVR system and its various components such as the computer system and the database may be enabled using software and/or using transistors, logic gates, and electrical circuits (for example, integrated circuit circuitry such as ASIC circuitry). Various embodiments of the disclosure may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein.

In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the disclosure, as discussed above, may be practiced with steps and/or operations in a different order, and/or with hardware elements in configurations, which are different than those which, are disclosed. Therefore, although the disclosure has been described based upon these exemplary embodiments, it is noted that certain modifications, variations, and alternative constructions may be apparent and well within the spirit and scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

The invention claimed is:

1. A video storage method, comprising:
storing a plurality of videos in a storage device of a system;
generating a metadata corresponding to each video of the plurality of videos, the metadata comprising a time of the storage of a respective video, a size of the respective video in the storage device, and a data from a plurality of sensors positioned in the system;
determining, for each video, a condition indicating a need for reducing size of the respective video,
wherein the condition comprises a storage period of the respective video exceeding a threshold time period,
wherein the storage period corresponds to a lapsed time period from at least one of: the time of storage of the respective video in the system, or a time of storage of a modified version of the respective video in the system; and
upon determination of the condition indicating the need for reducing size of the respective video:
reducing at least one quality parameter from a plurality of quality parameters of the respective video by a pre-determined decrement factor, wherein the respective video with reduced size is stored as the modified version of the respective video in the storage device; and
eliminating at least one video segment of the respective video corresponding to an uneventful region of the video; and
wherein eliminating at least one video segment further comprises: defining a set of cut-off values to an event-defining measuring unit, wherein the event-defining measuring unit comprises at least one of a G-sensor data, a number of dynamic pedestrians in the video segment, a number of dynamic vehicles in the video segment, presence of specific objects in the video segment or weights of an audio data corresponding to the respective video.

2. The method according to claim 1, comprising:
assigning a priority rank to each quality parameter of the plurality of quality parameters for sequentially reducing each video in a pre-defined sequence; and reducing a first quality parameter with low priority rank before reducing a second quality parameter with a high priority rank based on the pre-defined sequence.

3. The method according to claim 1, comprising: comparing a value of the at least one event-defining measuring unit of each video segment of the video with a first cut-off value of the set of cut-off values of the at least one event-defining measuring unit, wherein the first cut-off value corresponds to a lowest cut-off value among the cut-off values of the set of cut-off values; determining at least one video segment whose value of the at least one event-defining measuring unit is less than the first cut-off value; and upon determination, eliminating the at least one video segment, from the respective video, whose value of the at least one event-defining measuring unit is less than the first cut-off value.

4. The method according to claim 3, wherein the first cut-off value is applied for reducing the size of the video for a first time, wherein a subsequent cut-off value to the first cut-off value is applied for reducing the size of the video for a subsequent time to the first time, wherein the subsequent cut-off value is greater than the first cut-off value, and wherein the subsequent time is greater than the first time.

5. The method according to claim 1, wherein the at least one quality parameter of each video of the plurality of quality parameters comprises at least one of a frame rate of the respective video, number of color planes of the respective video, a resolution of the respective video, a specific region of interest within at least one frame of the respective video or a bit rate of the respective video.

6. The method according to claim 1, wherein the condition further comprises: the size of the respective video is greater than a threshold size; or a storage space left in the storage device is less than a threshold storage.

7. The method according to claim 1, wherein the plurality of videos is captured using at least one imaging device, wherein the at least one imaging device corresponds to at least one of a digital video recorder (DVR), a car DVR or a dashboard camera.

8. The method according to claim 7, comprising: uploading the respective video on a cloud-based storage before deleting the video from the storage device.

9. The method according to claim 1, comprising: deleting the respective video from the storage device based on determining that the size of the respective video is less than a threshold size, and the storage period of the respective video is greater than the threshold time period.

10. The method according to claim 1, comprising independently reducing the size of videos captured from each imaging device of a plurality of imaging devices.

11. The method according to claim 1, comprising: determining an event of interest in at least one video captured by a first imaging device of a plurality of imaging devices; determining a time range of an occurrence of the event of interest; and upon determination of the time range, retaining corresponding video captured, in the determined time range, by remaining imaging devices of the plurality of imaging devices.

12. The method according to claim 1, comprising: collaging the respective video from each imaging device of the plurality of imaging devices into a video snippet; determining an importance of the video snippet based on a collective importance of the respective video captured by the plurality of imaging devices; and based on the determined importance of the video snippet: reducing a size of the video snippet; or deleting the video snippet.

13. The method according to claim 1, comprising: receiving an access request from a remote device for accessing at least one video stored in the storage, wherein the at least one video comprises an event related to an important incident; receiving at least one user input related to the event, wherein the user input comprises at least one of: a time range including a time of occurrence of the event, a date of occurrence of the event, a location of occurrence of the event, or information related to a scene near the location of occurrence of the event; detecting at least one video segment in the video comprising the event based on the user input; and sending the at least one video segment to the remote device.

14. The method as claimed in claim 13, wherein detecting the at least one video segment, comprising the event, from the video further comprises: detecting peaks in a G-sensor trace of the video within the time range provided as the user input; or detecting dynamic objects in the video within the time range provided as the user input.

15. The method according to claim 13, wherein sending the at least one video segment to the remote device further comprises at least one of: sending a set of thumbnail images corresponding to the at least one video segment comprising events nearest to the time range; sending video segments comprising high sensitivity marked objects within the time range; sending video segments corresponding to the detected peaks in the G-sensor trace within the time range; sending the video in form a time-lapse video generated from the video; sending thumbnail images corresponding to a part of the video which comprises the scene based on a video summarization algorithm; or sending video segments corresponding to the location of occurrence of the event.

16. A method for retrieving at least one video stored in a storage device of a system, the method comprising:
    storing a plurality of videos in the storage device of the system;
    generating a metadata corresponding to each video of the plurality of videos, the metadata comprising a time of the storage of a respective video, a size of the respective video in the storage device, and a data from a plurality of sensors positioned in the system;
    determining, for each video, a condition indicating a need for reducing size of the respective video,
    wherein the condition comprises a storage period of the respective video exceeding a threshold time period,
    wherein the storage period corresponds to a lapsed time period from at least one of: the time of storage of the respective video in the system, or a time of storage of a modified version of the respective video in the system;
    upon determination of the condition indicating the need for reducing size of the respective video:
        reducing at least one quality parameter from a plurality of quality parameters of the respective video by a pre-determined decrement factor, wherein the respective video with reduced size is stored as the modified version of the respective video in the storage device; and
        eliminating at least one video segment of the respective video corresponding to an uneventful region of the video;
    wherein eliminating at least one video segment further comprises: defining a set of cut-off values to an event-defining measuring unit, wherein the event-defining measuring unit comprises at least one of a G-sensor data, a number of dynamic pedestrians in the video segment, a number of dynamic vehicles in the video segment, presence of specific objects in the video segment or weights of an audio data corresponding to the respective video;
    sending an access request to the system for accessing the at least one video stored in the storage device based on a unique ID of the system, wherein the at least one video comprises an event related to an important incident;

receiving at least one user input related to an event, wherein the user input comprises a time range including a time of occurrence of the event, and a date of occurrence of the event;

detecting, based on the user input, at least one video segment in the video based on at least a G- sensor data, a number of dynamic pedestrians in the video segment, a number of dynamic vehicles in the video segment, presence of specific objects in the video segment or weights of an audio data; and sending the at least one video segment to a remote device.

17. A system, comprising:

a memory configured to store instructions; and a processor configured to execute the instructions stored in the memory and thereby cause the system to perform at least in part to:

store a plurality of videos in the memory;

generate a metadata corresponding to each video of the plurality of videos, the metadata comprising a time of the storage of a respective video, a size of the respective video in the memory, and a data from a plurality of sensors positioned in the system;

determine, for each video, a condition indicating a need for reducing size of the respective video, wherein the condition comprises a storage period of the respective video exceeding a threshold time period, wherein the storage period corresponds to a lapsed time period from at least one of the time of storage of the respective video in the system, or a time of storage of a modified version of the respective video in the system; and upon determination of a condition indicating a need for reducing size of the respective video:

reduce at least one quality parameter from a plurality of quality parameters of the respective video by a pre-determined decrement factor; and wherein the respective video with reduced size is stored as the modified version of the respective video in the memory; and eliminate at least one video segment of the respective video corresponding to an uneventful region of the video; and wherein, to eliminate the at least one video segment, the processor is further configured to cause the system to:

define a set of cut-off values to an event-defining measuring unit, wherein the event-defining measuring unit comprises at least one of a G-sensor data, a number of dynamic pedestrians in the video segment, a number of dynamic vehicles in the video segment, presence of specific objects in the video segment or weights of an audio data corresponding to the respective video.

18. The system according to claim 17, wherein the processor is further configured to cause the system to perform at least in part to: compare a value of the at least one event-defining measuring unit of each video segment of the video with a first cut-off value of the set of cut-off values of the at least one event-defining measuring units, wherein the first cut-off value corresponds to a lowest cut-off value among the cut-off values of the set of cut-off values; determine at least one video segment whose value of the at least one event-defining measuring unit is less than the first cut-off value; and upon determination, eliminate the at least one video segment, from the respective video, whose value of the at least one event-defining measuring unit is less than the first cut-off value.

19. The system according to claim 18: wherein the first cut-off value is applied for the reducing the size of the video for a first time, wherein a subsequent cut-off value to the first cut-off value is applied for reducing the size of the video for a subsequent time to the first time, wherein the subsequent cut-off value is greater than the first cut-off value, and wherein the subsequent time is greater than the first time.

20. The system according to claim 17, wherein the at least one quality parameter of each video of the plurality of quality parameters comprises at least one of a frame rate of the respective video, number of color planes of the respective video, a resolution of the respective video, a specific region of interest within at least one frame of the respective video or a bit rate of the respective video.

21. The system according to claim 17, wherein the processor is further configured to cause the system to perform at least in part to: assign a priority rank to each quality parameter of the plurality of quality parameters for sequentially reducing each video in a pre-defined sequence; and reduce a first quality parameter with low priority rank before reducing a second quality parameter with a high priority rank based on the pre-defined sequence.

22. The system according to claim 17, wherein the condition further comprises: the size of the respective video is greater than a threshold size; or a storage space left in the memory is less than a threshold storage.

23. The system according to claim 17, comprising at least one imaging device to capture wherein the plurality of videos, wherein the at least one imaging device corresponds to at least one of a digital video recorder (DVR), a car DVR or a dashboard camera.

24. The system according to claim 17, wherein the processor is further configured to cause the system to perform at least in part to: delete the respective video from the memory based on determining that the size of the respective video is less than a threshold size, and the storage period of the respective video is greater than the threshold time period.

25. The system according to claim 24, wherein the processor is further configured to cause the system to perform at least in part to: upload the respective video on a cloud-based storage before deleting the video from the memory.

26. The system according to claim 17, wherein the processor is further configured to cause the system to perform at least in part to independently reduce the size of videos captured from each imaging device of a plurality of imaging devices.

27. The system according to claim 17, wherein the processor is further configured to cause the system to perform at least in part to: determine an event of interest in at least one video captured by a first imaging device of a plurality of imaging devices; determine a time range of an occurrence of the event of interest; and upon determination of the time range, retain corresponding video captured, in the determined time range, by remaining imaging devices of the plurality of imaging devices.

28. The system according to claim 17, wherein the processor is further configured to cause the system to perform at least in part to: collage the respective video from each imaging device of the plurality of imaging devices into a video snippet; determine an importance of the video snippet based on a collective importance of the respective video captured by the plurality of imaging devices; and upon determination of the importance of the video snippet perform at least one of: reduce a size of the video snippet; or delete the video snippet.

29. The system according to claim 17, wherein the processor is further configured to cause the system to perform at least in part to: receive an access request from a remote device for accessing at least one video stored in the storage, wherein the at least one video comprises an event related to an important incident; receive at least one user input related to the event, wherein the user input comprises at least one of: a time range including a time of occurrence of the event, a date of occurrence of the event, a location of occurrence of the event, or information related to a scene near the location of occurrence of the event; detect at least one video segment in the video comprising the event based on the user input; and send the at least one video segment to the remote device.

30. The system as claimed in claim 29, wherein the processor is further configured to cause the system to detect at least one of a video segment, comprising the event, from the video based on at least one of: detect peaks in a G-sensor trace of the video within the time range provided as the user input; or detect dynamic objects in the video within the time range provided as the user input.

31. The system according to claim 29, wherein the processor is further configured to cause the system to send the at least one video segment to the remote device in form of at least one of: a set of thumbnail images corresponding to the at least one video segment comprising events nearest to the time range; video segments comprising high sensitivity marked objects within the time range; video segments corresponding to the detected peaks in the G-sensor trace within the time range; the video in form a time-lapse video generated from the video; thumbnail images corresponding to a part of the video which comprises the scene based on a video summarization algorithm; or video segments corresponding to the location of occurrence of the event.

* * * * *